(12) United States Patent
Pawlowski et al.

(10) Patent No.: US 12,158,852 B2
(45) Date of Patent: Dec. 3, 2024

(54) CIRCUITRY AND METHODS FOR DIRECT MEMORY ACCESS INSTRUCTION SET ARCHITECTURE SUPPORT FOR FLEXIBLE DENSE COMPUTE USING A RECONFIGURABLE SPATIAL ARRAY

(71) Applicant: Intel Corporation, Santa Clara, CA (US)

(72) Inventors: Robert Pawlowski, Beaverton, OR (US); Bharadwaj Krishnamurthy, Hillsboro, OR (US); Shruti Sharma, Hillsboro, OR (US); Byoungchan Oh, Hillsboro, OR (US); Jing Fang, Santa Clara, CA (US); Daniel Klowden, Portland, OR (US); Jason Howard, Portland, OR (US); Joshua Fryman, Corvallis, OR (US)

(73) Assignee: Intel Corporation, Santa Clara, CA (US)

( * ) Notice: Subject to any disclaimer, the term of this patent is extended or adjusted under 35 U.S.C. 154(b) by 650 days.

(21) Appl. No.: 17/358,832

(22) Filed: Jun. 25, 2021

(65) Prior Publication Data

US 2022/0414038 A1    Dec. 29, 2022

(51) Int. Cl.
  *G06F 13/28*    (2006.01)
(52) U.S. Cl.
  CPC .......... *G06F 13/28* (2013.01); *G06F 2213/28* (2013.01)
(58) Field of Classification Search
  None
  See application file for complete search history.

(56) References Cited

U.S. PATENT DOCUMENTS 10,795,819 B1    10/2020    Pawlowski et al.
10,929,132 B1    2/2021    Pawlowski et al.
(Continued)

OTHER PUBLICATIONS

Aananthakrishnan et al., "PIUMA: Programmable Integrated Unified Memory Architecture", arXiv:2010.06277v1 [cs.AR], Oct. 13, 2020, pp. 1-6.

*Primary Examiner* — Scott C Sun
(74) *Attorney, Agent, or Firm* — NICHOLSON DE VOS WEBSTER & ELLIOTT LLP

(57) ABSTRACT

Systems, methods, and apparatuses for direct memory access instruction set architecture support for flexible dense compute using a reconfigurable spatial array are described. In one embodiment, a processor includes a first type of hardware processor core that includes a two-dimensional grid of compute circuits, a memory, and a direct memory access circuit coupled to the memory and the two-dimensional grid of compute circuits; and a second different type of hardware processor core that includes a decoder circuit to decode a single instruction into a decoded single instruction, the single instruction including a first field to identify a base address of two-dimensional data in the memory, a second field to identify a number of elements in each one-dimensional array of the two-dimensional data, a third field to identify a number of one-dimensional arrays of the two-dimensional data, a fourth field to identify an operation to be performed by the two-dimensional grid of compute circuits, and a fifth field to indicate the direct memory access circuit is to move the two-dimensional data indicated by the first field, the second field, and the third field into the two-dimensional grid of compute circuits and the two-dimensional grid of compute circuits is to perform the operation on the two-dimensional data according to the fourth field, and an execution circuit to execute the decoded single instruction according to the fields.

24 Claims, 24 Drawing Sheets

(56) References Cited

U.S. PATENT DOCUMENTS

| | | |
|---|---|---|
| 10,983,793 B2 | 4/2021 | Fryman et al. |
| 2018/0189063 A1 | 7/2018 | Fleming et al. |
| 2018/0189231 A1 | 7/2018 | Fleming et al. |
| 2019/0042254 A1 | 2/2019 | Sade et al. |
| 2020/0004587 A1 | 1/2020 | Griffin et al. |
| 2020/0104164 A1 | 4/2020 | Pawlowski et al. |
| 2020/0401412 A1 | 12/2020 | Pawlowski et al. |
| 2020/0409701 A1 | 12/2020 | Chen et al. |
| 2021/0248094 A1* | 8/2021 | Norman .............. G06F 12/0893 |

* cited by examiner

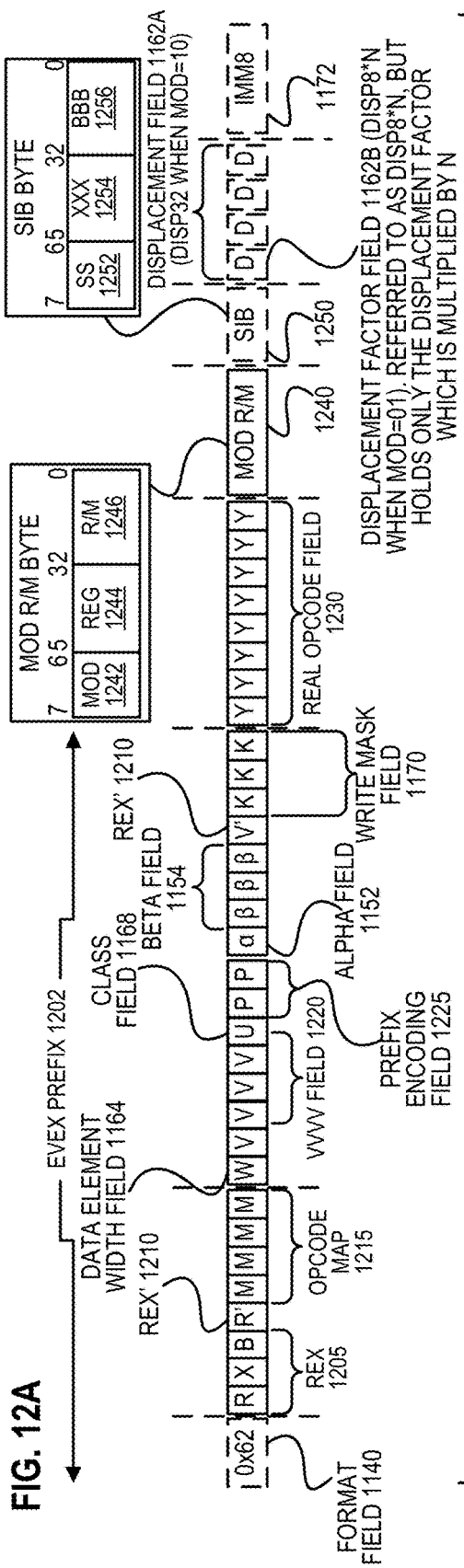
FIG. 12A
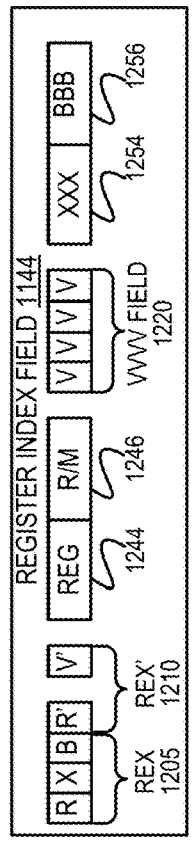
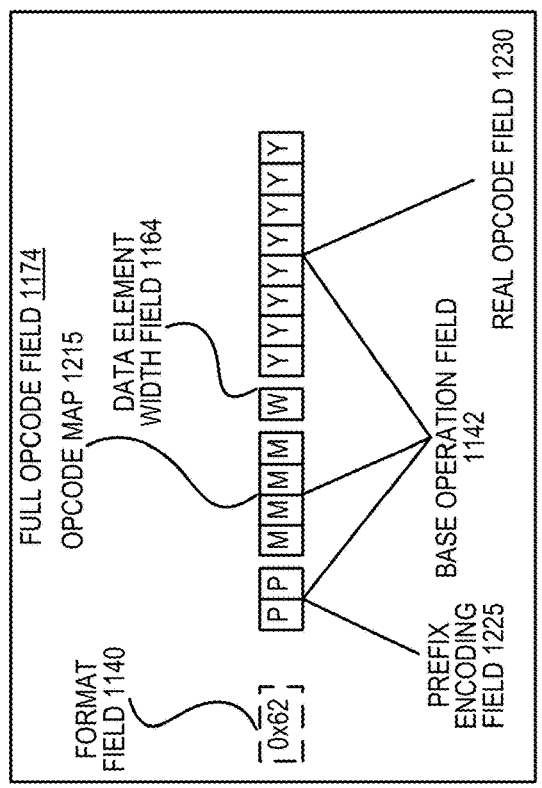
FIG. 12B
FIG. 12C

CIRCUITRY AND METHODS FOR DIRECT MEMORY ACCESS INSTRUCTION SET ARCHITECTURE SUPPORT FOR FLEXIBLE DENSE COMPUTE USING A RECONFIGURABLE SPATIAL ARRAY

STATEMENT REGARDING FEDERALLY SPONSORED RESEARCH AND DEVELOPMENT

This invention was made with Government support under Agreement No. HR0011-17-3-0004, awarded by DARPA. The Government has certain rights in the invention.

TECHNICAL FIELD

The disclosure relates generally to electronics, and, more specifically, an embodiment of the disclosure relates to circuitry to implement instructions for a reconfigurable array of compute circuits.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 12A is a block diagram illustrating fields for the generic vector friendly instruction formats in FIGS. 11A and 11B according to embodiments of the disclosure.

FIG. 12B is a block diagram illustrating the fields of the specific vector friendly instruction format in FIG. 12A that make up a full opcode field according to one embodiment of the disclosure.

FIG. 12C is a block diagram illustrating the fields of the specific vector friendly instruction format in FIG. 12A that make up a register index field according to one embodiment of the disclosure.

DETAILED DESCRIPTION

Figure 1:
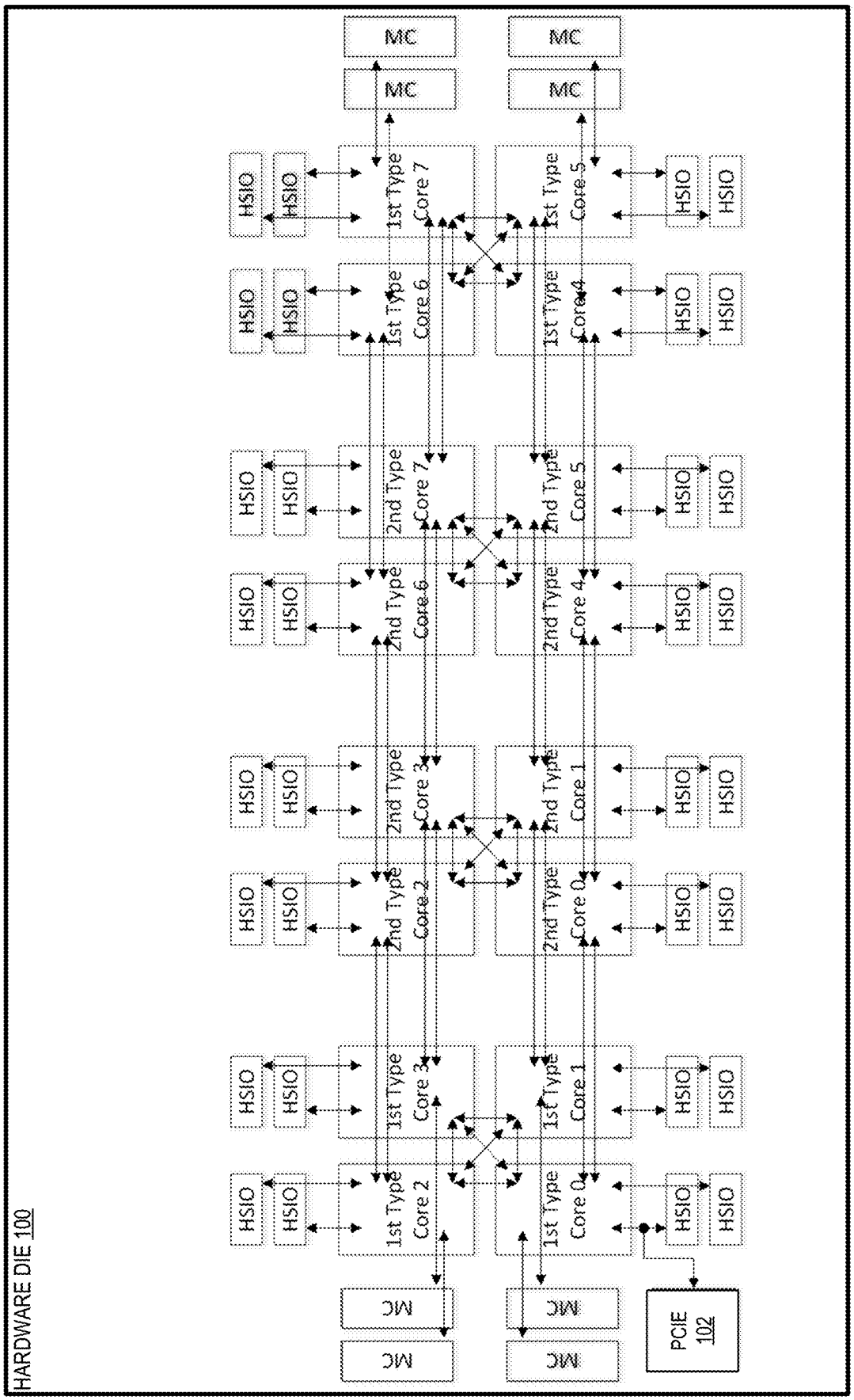
FIG. 1 illustrates a block diagram of a hardware die including a plurality of cores for a first type and plurality of cores of a second type according to embodiments of the disclosure.

In the following description, numerous specific details are set forth. However, it is understood that embodiments of the disclosure may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Sparse workloads exhibit a large number of random remote memory accesses and are heavily network and memory bandwidth-intensive and less dependent on compute capability. Certain embodiments herein are directed to a scalable processor architecture for targeting sparse graph applications. To efficiently address this workload space, certain embodiments are directed to a system architecture that has: (1) a highly scalable low-diameter and high-radix network; and (2) many optimized memory interfaces on each die in the system.

While this architectural approach provides efficient support for workloads that are truly sparse, it may lack sufficient compute performance to execute dense kernels (e.g., matrix multiply, convolution, etc.) at needed performance. To correct this performance gap, embodiments herein are directed to a (e.g., dense compute) core, e.g., with a plurality of these cores (e.g., eight cores or any other number) in each die of such a system.

Certain systolic arrays maintain strict connectivity between the compute (e.g., processing) elements in the array, which limits programmability of the types of operations or input data sizes. Any attempt to utilize the systolic array outside of its defined use results in poor latency and power efficiency. Therefore, there is an algorithmic overhead needed for algorithms that do not cleanly map to a systolic array. Certain other more programmable approaches (e.g., CPUs or GPUs) allow for more algorithmic flexibility but sacrifice peak compute capability. In one embodiment, a systolic array is programmed using a dedicated instruction set architecture (ISA). However, due to the rigidness of the architecture, such an ISA itself does not provide a wide range of programmability in certain embodiments. In one embodiment, a multiple (e.g., 256×256) element systolic array is accessed using CISC-like instructions from a host processor (e.g., over PCIe). However, these instructions are limited to specifying a matrix multiply or convolution that cleanly maps to the systolic array (e.g., otherwise preprocessing is needed) in certain embodiments.

Embodiments herein are directed to a reconfigurable array of compute circuits that is paired with a direct memory access (DMA) (e.g., micro-DMA) ISA as described in this disclosure, e.g., to provide more algorithmic flexibility from the programmability built into the DMA instructions. Embodiments herein are directed to an architectural approach to a DMA engine (e.g., circuit) surrounding a reconfigurable array of compute circuits. Embodiments herein include new instructions for initiating the data movement, as well as the internal organization and address generation mechanisms of a DMA engine, e.g., a micro-DMA (μDMA) engine. By optimizing the engine responsible for data movement around the compute array, the peak performance is more likely to be achieved for a wider range of kernels. Additionally, adding flexibility for data structure organization reduces the need for algorithmic preprocessing, which increases the overall performance of the algorithm.

Figure 2:
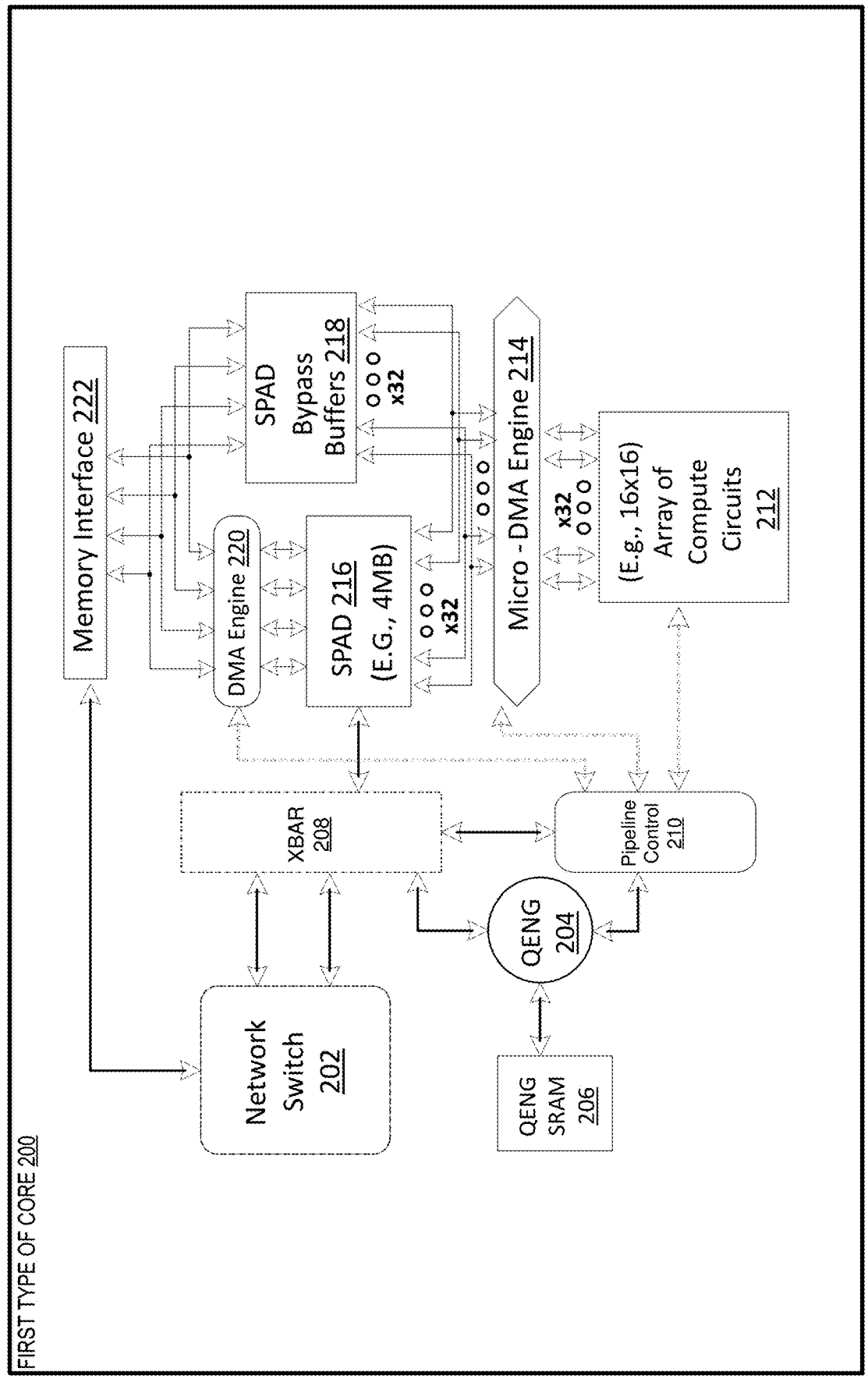
FIG. 2 illustrates a block diagram of a first type of hardware processor core comprising a direct memory access engine and an array of compute circuits according to embodiments of the disclosure.
Figure 8:
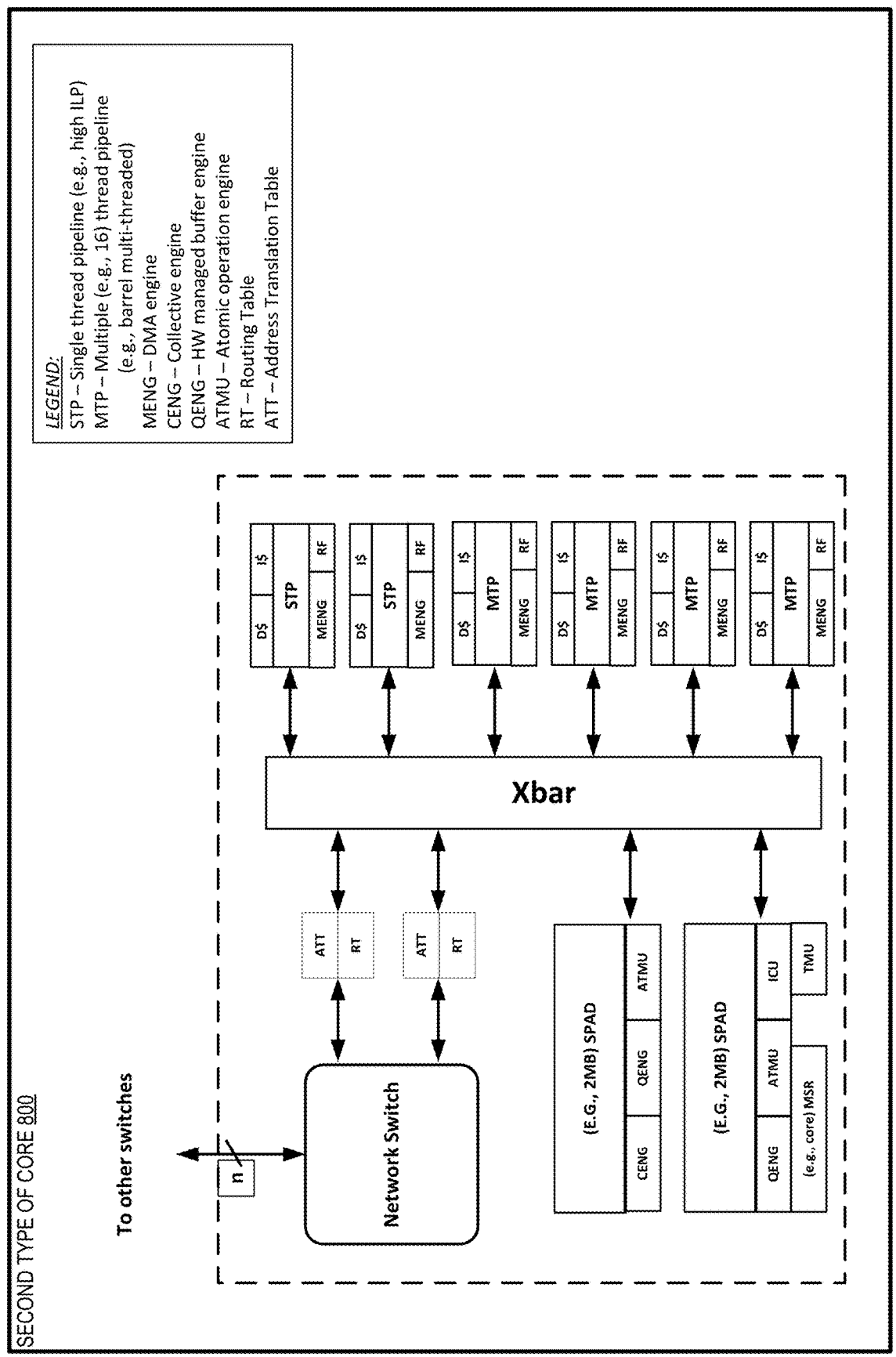
FIG. 8 illustrates a block diagram of a second type of hardware processor core comprising a plurality of single thread pipelines and a plurality of multiple thread pipelines according to embodiments of the disclosure.

FIG. 1 illustrates a block diagram of a hardware die 100 including a plurality of cores (e.g., indexed from 0 to 7) for a first type and plurality of cores (e.g., indexed from 0 to 7) of a second type according to embodiments of the disclosure. In certain embodiments, kernel functions are offloaded from threads in the second type of cores to the first type of (e.g., dense cores), for example, via directed messages. In certain embodiments, a first type of core is as depicted in FIG. 2. In certain embodiments, a second type of core is as depicted in FIG. 8. In certain embodiments, the first type of cores (e.g., and their associated memories) are exposed to the programmer via their own memory map. In certain embodiments, a plurality of memory controllers (plurality of MC) are included in hardware die 100, e.g., to access a memory separate from hardware die 100 (e.g., processor, system, or system-on-a-chip (SoC). In certain embodiments, a plurality of (e.g., high speed) input/output (TO) (e.g., HSIO) circuitry (plurality of MC) are included in hardware die 100. In certain embodiments, (e.g., PCIe) controller 102 is included, for example, to communicate with another processor or core, e.g., core 1490 in FIG. 14B.

FIG. 2 illustrates a block diagram of a first type of hardware processor core 200 comprising a direct memory access engine 214 and an array of compute circuits 212 according to embodiments of the disclosure. In certain embodiments, each compute circuit supports addition, subtraction, multiplication, division, and/or various logic operations. In certain embodiments, other kinds of compute circuits are created by substituting different kinds of functional circuitry. For example, a compute circuit may include a fused multiply add (FMA) circuit. In certain embodiments, the compute circuits are coupled together by a programmable interconnect, e.g., mesh. In certain embodiments, a second type of core (e.g., core 800 in FIG. 8) is to offload certain operations (e.g., offload kernel function pointers) to the first type of (e.g., dense data) processor core 200, e.g., via the network shown by arrows in FIG. 1. In certain embodiments, the first type of core and the second type of core (e.g., fully) support a same ISA.

In certain embodiments, offload queue management engine (QENG) 204 (e.g., including a decoder circuit and/or an execution circuit) is to receive a request to perform an operation, e.g., receive an instruction, and cause a corresponding action(s) to be performed. In certain embodiments, a direct memory access instruction is received by offload queue management engine 204 (e.g., from memory (e.g., static RAM (SRAM) 206), which causes the first type of core 200 to perform an operation. In certain embodiments, offload queue management engine 204 causes pipeline control 210 to cause certain action(s) in crossbar 208, DMA engine 220, and/or micro-DMA engine 214. In certain embodiments, memory interface 222 is coupled to a (e.g., system) memory, e.g., external form the core 200. In certain embodiments, other components (e.g., core(s)) are coupled to core 200 via network switch 202.

In certain embodiments, a (e.g., direct memory access) instruction enables programmability of compute array inputs and/or outputs. In certain embodiments, a micro-DMA engine 214 is coupled to array of compute circuits 212, a scratch pad memory 216 (e.g., memory address accessible), and/or a buffer 218 (e.g., not memory address accessible) that bypasses the SPAD. In one embodiment, local scratchpad (SPAD) 216 is used when there is a high data-reuse and bypass SPAD buffer 218 is used for low-reuse to reduce offload latency. Thirty-two parallel input/output ports are used as an example, and it should be understood that other numbers of ports may be utilized, e.g., 64, 128, etc. In certain embodiments, micro-DMA engine 214 is not coupled to memory external to core 200 and/or is not part of a cache coherency hierarchy.

In certain embodiments, scratch pad memory 216 and/or buffers 218 (e.g., one for each input/output port) are loaded with data sourced by DMA engine 220, e.g., as caused by a respective instruction. In certain embodiments, array of compute circuits 212 is loaded with data sourced by micro-DMA engine 220 from scratch pad memory 216 and/or buffers 218, for example, as caused by a respective instruction (e.g., different than the instruction that loaded the scratch pad memory 216 and/or buffers 218 with data).

In certain embodiments, array of compute circuits 212 is implemented as a (e.g., 16 element×16 element) reconfigurable spatial array of compute circuits (e.g., a dense array (DA)) capable of a variety of floating point and integer operations of varying precisions (e.g., a grid of floating-point unit (FPU) and/or arithmetic-logic unit (ALU) blocks). In certain embodiments, the micro-DMA engine is a set of micro-DMA (μDMA) circuits responsible for data movement between the array of compute circuits 212 and the source/destination memory locations (e.g., in scratch pad memory 216 and/or buffers 218). Embodiments herein are directed to a micro-DMA and its associated programmability.

In certain embodiments, the array of compute circuits 212 is reconfigurable (e.g., by a user), e.g., it allows for multiple methods of connectivity between its internal compute circuits. In certain embodiments, the connectivity is pre-configured in the array of compute circuits 212 before (e.g., kernel) execution begins. In certain embodiments, each configuration is assigned a seed value which is referenced by the programmer when issuing the DMA (e.g., μDMA) instruction(s) to initiate the data movement. Embodiments herein utilize a reconfigurable array of compute circuits because (i) given optimal array configuration, it provides high compute efficiency for a subset of kernels under a variety of input and output matrix sizes, and the programmability of the DA (e.g., via the μDMA instructions) seamlessly integrates into an ISA (e.g., an ISA for the second core type) with minimal control pipeline modifications.

Figure 3A:
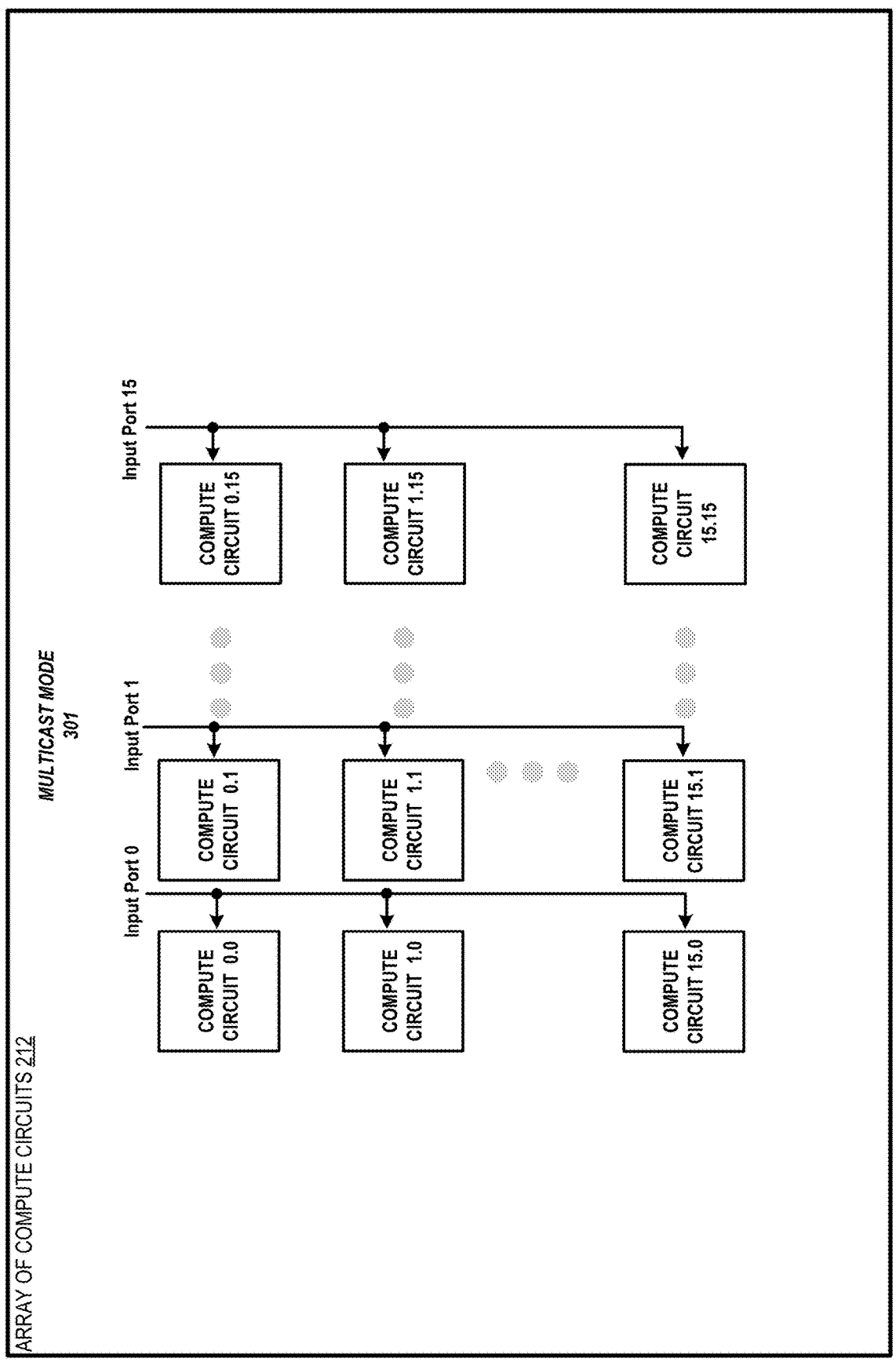
FIG. 3A illustrates a block diagram of an array of compute circuits in a multicast mode according to embodiments of the disclosure.

FIG. 3A illustrates a block diagram of an array of compute circuits 212 in a multicast mode 301 according to embodiments of the disclosure. As depicted, the compute circuits are each indexed by a value (e.g., between 0 and 15 for each row and each column). In certain embodiments, an array of compute circuits 212 in a multicast mode 301 causes a same value (e.g., from a 1D array of input data) to be broadcast to a proper subset of compute circuits (e.g., shown as entire columns, but entire rows, or a subset of 2D blocks are possible in other embodiments), for example, a first value input to all compute circuits in the first row via input port 0, a second value input to all compute circuits in the second row via input port 1, etc.

Figure 3B:
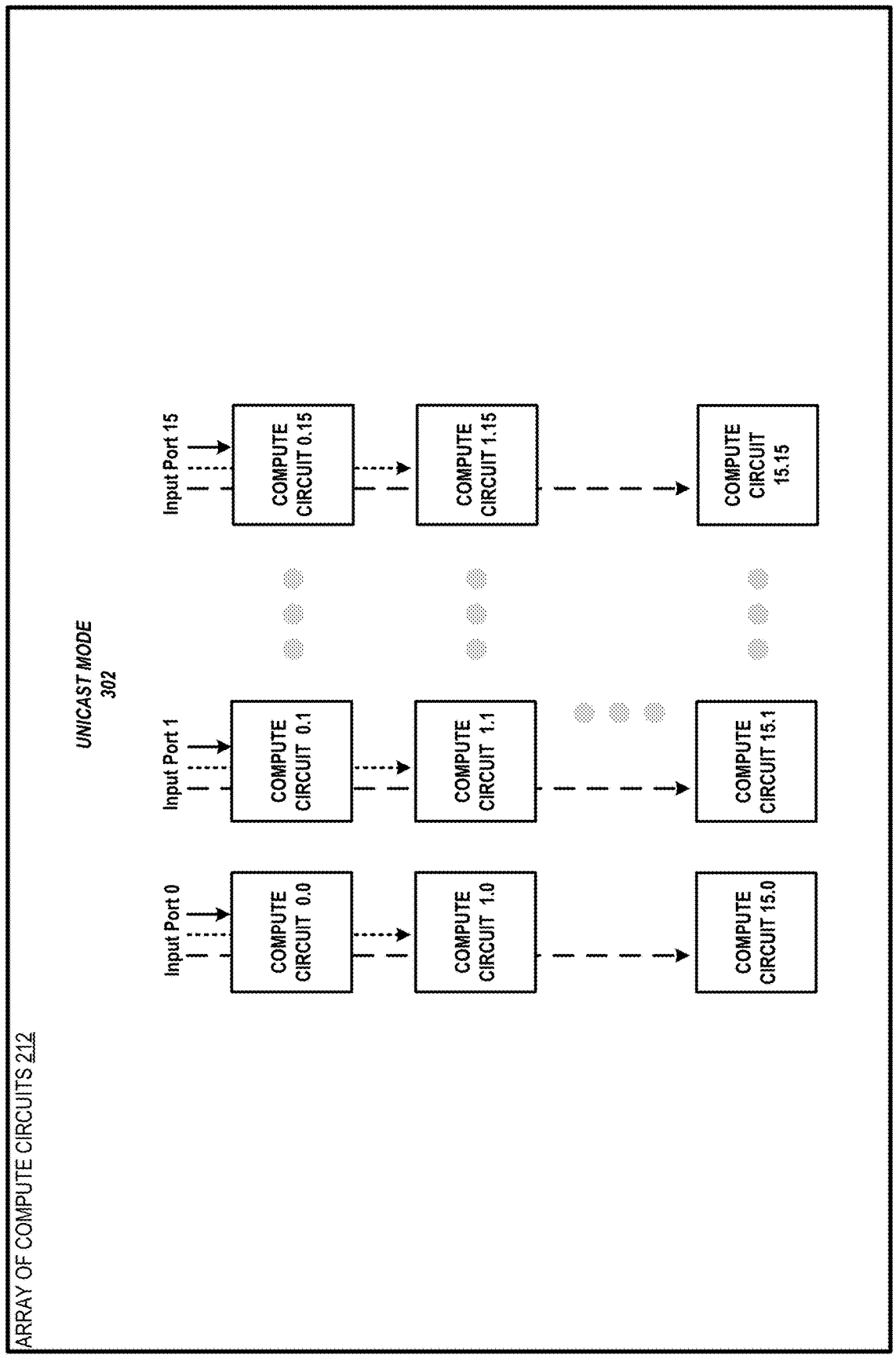
FIG. 3B illustrates a block diagram of an array of compute circuits in a unicast mode according to embodiments of the disclosure.

FIG. 3B illustrates a block diagram of an array of compute circuits 212 in a unicast mode 302 according to embodiments of the disclosure. In certain embodiments, an array of compute circuits 212 in a unicast mode 302 causes a different value (e.g., from a 2D matrix of input data) to be sent to a respective compute circuits (e.g., shown as being performed on an entire row for each successive operation (e.g., cycle), but entire columns, or a subset of 2D blocks or all compute circuits are possible in other embodiments), for example, a first value input to compute circuit 0.0 in the first row via input port 0, a second value input to compute circuit 0.1 in the second row via input port 1, etc. for a first 1D array of a 2D matrix, then a first value input to compute circuit 0.0 in the first row via input port 0, a second value input to compute circuit 0.1 in the second row via input port 1, etc. for a second 1D array of a 2D matrix, and so forth.

Figure 3C:
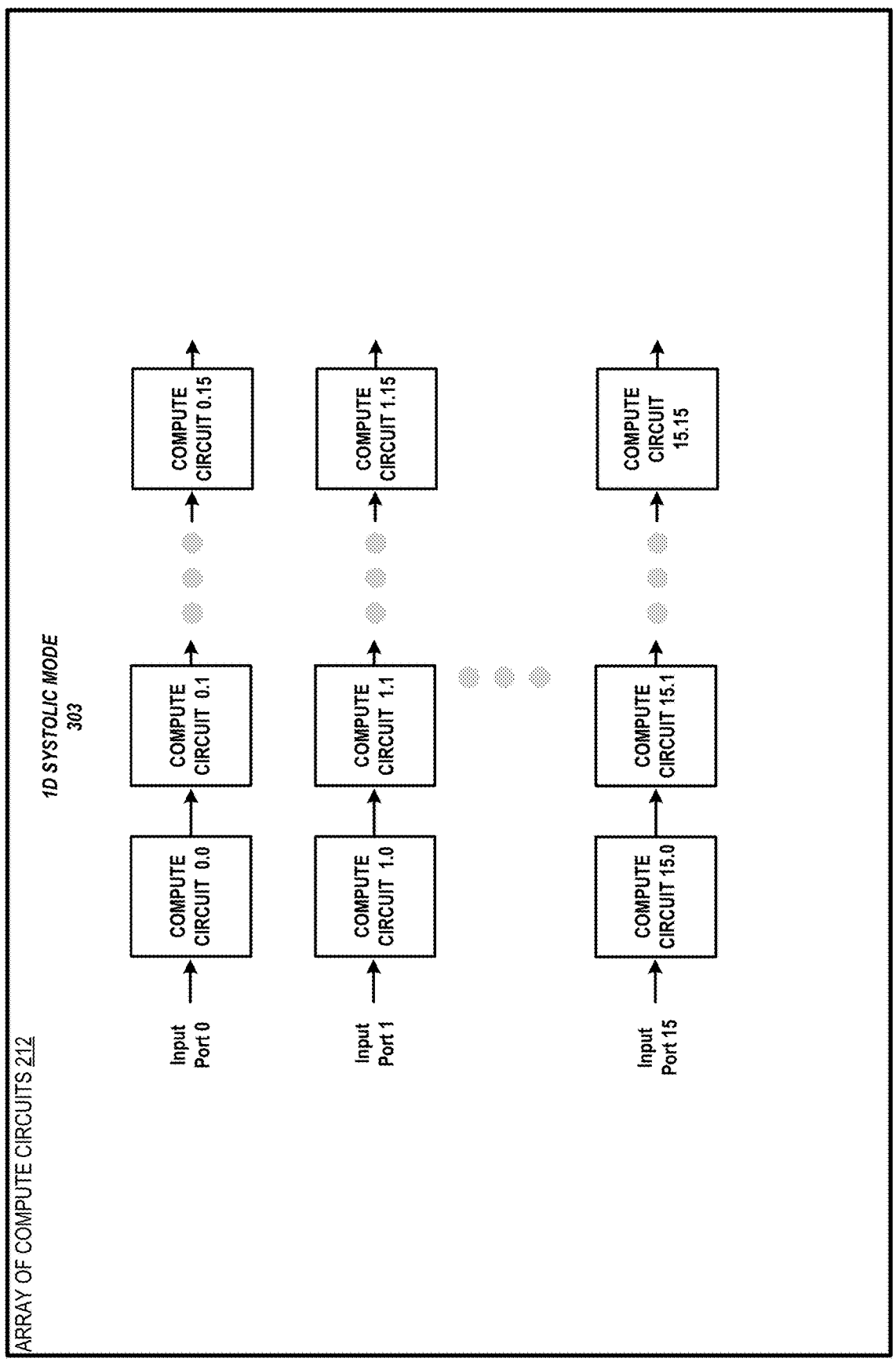
FIG. 3C illustrates a block diagram of an array of compute circuits in a one-dimensional (1D) systolic mode according to embodiments of the disclosure.

FIG. 3C illustrates a block diagram of an array of compute circuits 212 in a one-dimensional (1D) systolic mode 303 according to embodiments of the disclosure. In certain embodiments, an array of compute circuits 212 in one-dimensional (1D) systolic mode 303 causes a different value (e.g., from a 1D array of input data) to be sent to a respective compute circuits (e.g., shown as being performed on first compute circuits in a first column, but other columns, or rows are possible in other embodiments), for example, a first value input to compute circuit 0.0 in the first column via input port 0, a second value input to compute circuit 1.0 in the first column via input port 1, etc. for a 1D array.

To achieve the optimal combination of ease of programmability and high compute performance through an array of compute circuits, embodiments herein utilize a DMA engine (e.g., micro-DMA engine) to provide the following features: (i) flexibility in the input/output matrix characteristics (e.g., configurability of row and/or column dimensions as well as the organization of the data structure in memory (e.g., row major or column major)), (ii) supporting the method of data movement and memory access patterns for multiple modes of the array (e.g., multicast, unicast, or systolic mode), and (iii) providing high parallelism at each array input/output to hit the highest performance.

In certain embodiments, the DMA (e.g., μDMA) engines surround the configurable array and connect (e.g., at up to 32-ports). In certain embodiments, the DMA engines themselves provide the interface between the array and the surrounding memory and network.

Figure 4:
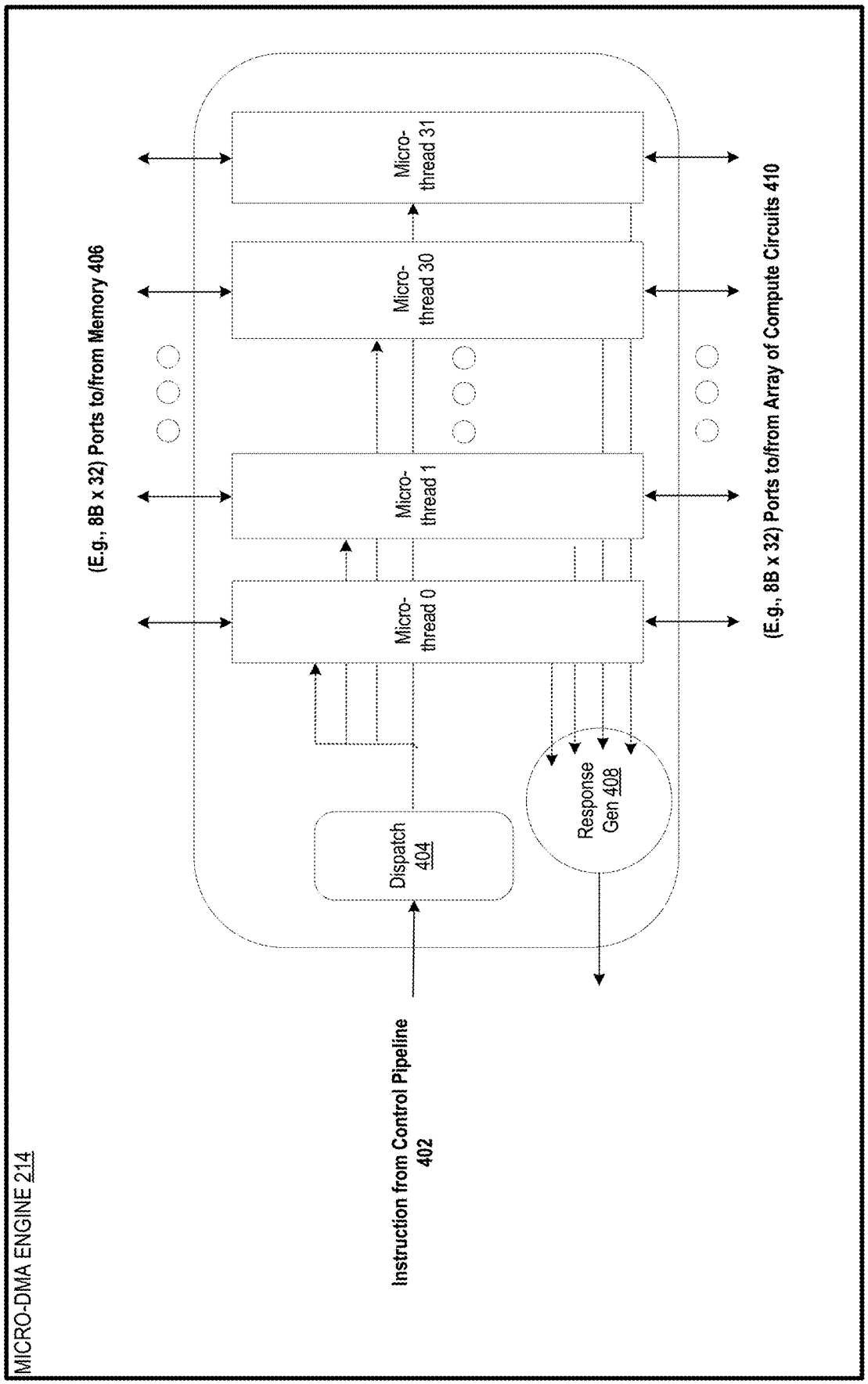
FIG. 4 is a block diagram of a direct memory access engine according to embodiments of the disclosure.

FIG. 4 is a block diagram of a (e.g., micro) direct memory access engine 214 according to embodiments of the disclosure. In certain embodiments, (e.g., micro) direct memory access engine 214 includes a dispatch control circuit 404 to dispatch memory requests (e.g., loads and/or stores) (i) for ports 406 to and/or from memory (e.g., scratch pad memory 216 and/or buffers 218 in FIG. 2) in parallel (e.g., every cycle), for example, for a micro-thread shown as columns in FIG. 4, and/or (ii) for ports 410 to array of compute circuits 212.

In certain embodiments, data is to be pushed into (e.g., all columns in parallel of) the array of compute circuits 212 every cycle and/or to be received out of the array of compute circuits 212 every cycle to maintain peak throughput. In certain embodiments, the DMA engine 214 has full parallel connectivity to all input and output horizontal and vertical buses each cycle. For an example of a 16×16 array of compute circuits, this means 32 input ports and 32 output ports in one embodiment. In certain embodiments, dispatch control circuit 404 receives instructions (or commands) from the pipeline control (e.g., pipeline control 210 in FIG. 2), determines which micro-thread(s) (μ-thread) are part of the DMA data in operation (e.g., as caused by a μdma.in instruction) or DMA data out operation (e.g., as caused by a μdma.out instruction), e.g., and sets the start address for each participating μ-thread. In certain embodiments, each μ-thread interfaces with a unique port of the array of compute circuits (e.g., and to the local scratchpad memory). In certain embodiments, the response generation circuit 408 monitors the status of each memory request (e.g., μ-thread), e.g., and sends the final completion signal to the pipeline control.

In certain embodiments, for a given instruction, the μ-thread allocation is based on the following: (i) Top/Right (T/R): If set to 1'b0, μ-threads [0-15] will be used (e.g., column-wise ports of array of compute circuits), and if set to 1'b1, μ-threads [16-31] will be used (e.g., row-wise ports of array of compute circuits), (ii) Array Width: Once the port set (e.g., top or right) is known, the ports within that set that are used are based on the "array_width" variable (e.g., where the array width is a multiple (e.g., 4) bit value that selects the number of ports (e.g., μ-threads) from 0 to array_width that the dispatch circuit 404 will active to service the instruction (e.g., where each element is 8 Bytes wide), (iii) Row/Column (R/C): If the R/C bit is equal to 1'b0, each μ-thread will operate on a specific element of each row of the input matrix (of size array_width), for example, for a 4 element array, μ-thread 1 will move element 1 in/out of the array 212, μ-thread 2 will move element 2, and so on; assuming that each element is 8 bytes, each μ-thread's starting address is shifted by 8 bytes from the previous μ-thread's starting address; if the R/C bit is equal to 1'b1, each μ-thread will operate on all elements of a single row in the input matrix array, e.g., in this case, 'array_width' determines the total number of rows in the array, for example, for a matrix with 4 rows, μ-thread 1 will move all elements in row 1 in/out of the array, μ-thread 2 will move all elements of row 2, and so on; assuming that each element is 8 Bytes, each μ-thread's starting address is equal to the input address added with the (row width*number of rows) and shifted by 8 Bytes, or any combination thereof.

In certain embodiments, each element that is to be loaded or stored by DMA engine (e.g., each element that a μ-thread operates on) will have a unique memory address, e.g., either the source or destination address depending on the instruction (e.g., μdma.in instruction and μdma.out instruction. In certain embodiments, the address generation of each element by the DMA engine 214 is based on two variables: the 'array_width' value received with the instruction, and the ID of the μ-thread, for example, where this ID value is set for each μ-thread depending on the order it is given, e.g., μ-thread 0 is connected to port 0, μ-thread 1 is connected to port 1, and so on. In certain embodiments, if the R/C bit is set to 0, it indicates that each port will be sending all of the elements of the same column of the matrix, for example, where the input address received from the dispatch circuit 404 is already offset to the μ-thread's position in the array (e.g., row). Thus, in certain embodiments, the address update for each element consists of moving to the next relevant (e.g., 8-Byte) chunk. In certain embodiments, this movement depends on the array width, for example, if the array width ("array width") is two elements, then the next position is offset by the corresponding number of bits (e.g., 16-Bytes) from the current position. In certain embodiments, if the R/C bit is set to 1, it indicates that each port will be sending all of the elements of the same 1D array (e.g., row) of the matrix, for example, where the input address received from the dispatch circuit 404 is already offset to the μ-thread's row number. Thus, in certain embodiments, the address update for each element consists of moving to the next (e.g., 8-Byte) element in the row. In certain embodiments, the total number of elements in a row is set by the count input, e.g., where the array width will determine the row number of the port and is not relevant to the address generation.

In certain embodiments, an array of computer circuits supports multiple modes (e.g., multicast/unicast Mode), and thus the (e.g., mesh) network of the array provides the ability for a single μDMA port to send data to a single compute circuit (e.g., in unicast) or multiple compute circuits (e.g., multicast) with a single data push. In certain embodiments, while the datapath internal to the array is dependent on the network configuration, the μDMA engine is to modify its requests depending on the intended communication type. Example functionality of the μDMA engine for a multicast and a unicast case is as follows: (i) Multicast: In certain embodiments, in multicast mode, the port sends a single value to all compute circuits in a column (or row) in the same request, for example, by using a single array configuration, and therefore when the μDMA engine is issuing requests in multicast mode all requests will be sent to the array with the same configuration ID, and (ii) Unicast: In certain embodiments, in unicast mode, each compute circuit in the column (r row) will receive a different data value from the same port, for example, where in each cycle, the μDMA port will issue a new request targeting a different CU in the column. To accomplish this, in certain embodiments, the port will send each request with a different configuration ID, e.g., the first request will be issued with the "config_num" (e.g., as discussed below) received with the μdma.in instruction, and each following request will increment the configuration ID.

Figure 5:
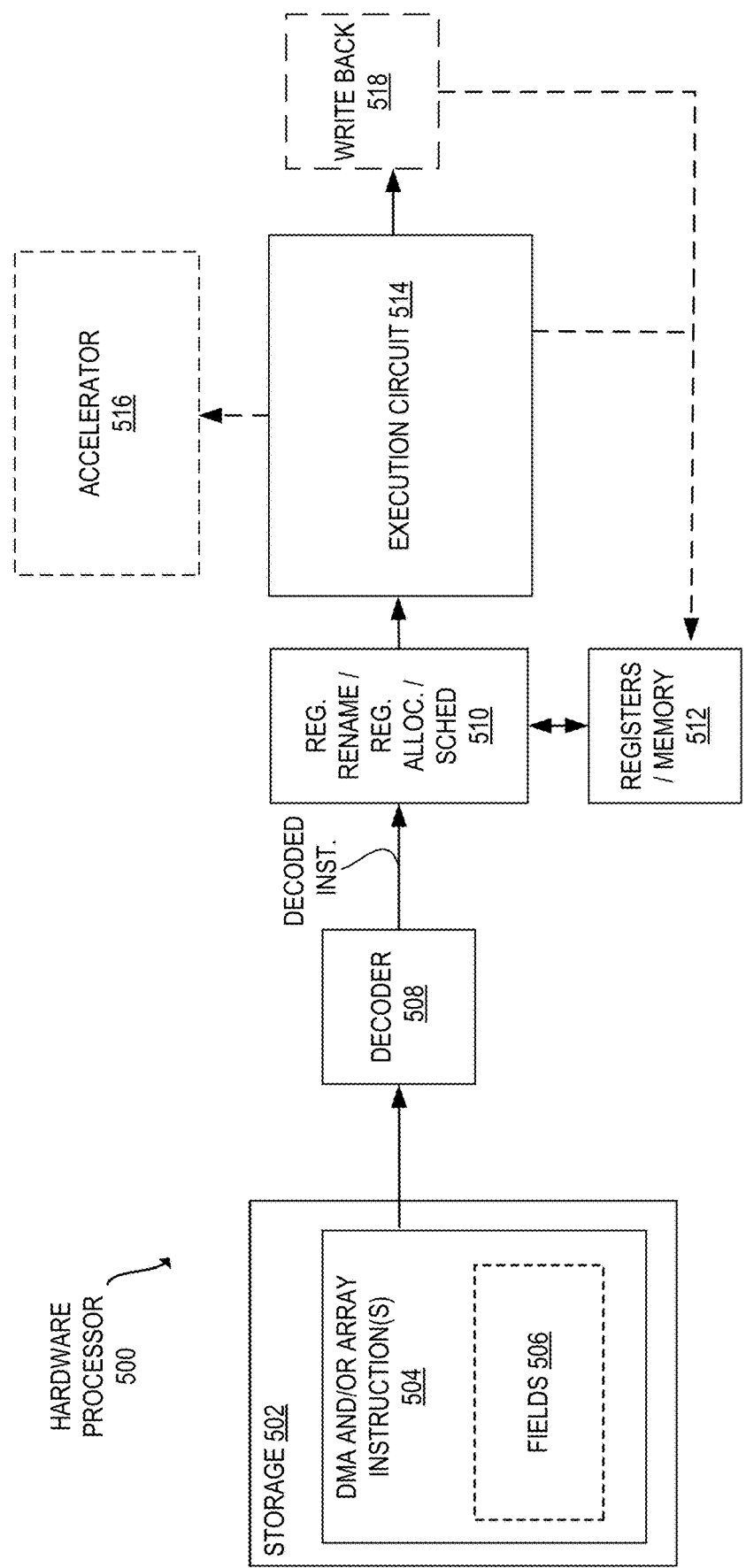
FIG. 5 illustrates a hardware processor coupled to storage that includes one or more direct memory access instructions according to embodiments of the disclosure.

FIG. 5 illustrates a hardware processor 500 coupled to storage 502 that includes one or more direct memory access (DMA) (and/or array of compute circuits) instructions 504 according to embodiments of the disclosure. In certain embodiments, an instruction 504 is according to any of the disclosure herein. In certain embodiments, instruction 504 includes and/or identifies one or more fields 506 (e.g., as discussed in reference to Table 1 below).

In one embodiment, e.g., in response to a request to perform an operation, the instruction (e.g., macro-instruction) is fetched from storage 502 and sent to decoder 508. In the depicted embodiment, the decoder 508 (e.g., decoder circuit) decodes the instruction into a decoded instruction (e.g., one or more micro-instructions or micro-operations). The decoded instruction is then sent for execution, for example, via scheduler circuit 510 to schedule the decoded instruction for execution, e.g., within DMA engine and/or array of compute circuits.

In certain embodiments, (e.g., where the processor/core supports out-of-order (OoO) execution), the processor includes a register rename/allocator circuit 510 coupled to register file/memory circuit 512 (e.g., unit) to allocate resources and perform register renaming on registers (e.g., registers associated with the initial sources and final destination of the instruction). In certain embodiments, (e.g., for out-of-order execution), the processor includes one or more scheduler circuits 510 coupled to the decoder 508. The scheduler circuit(s) may schedule one or more operations associated with decoded instructions, including one or more operations decoded from an instruction 504, e.g., for offloading execution of an operation to accelerator 516 (e.g., including a DMA engine and/or array of compute circuits) by the execution circuit 514.

In certain embodiments, a write back circuit 518 is included to write back results of an instruction to a destination (e.g., write them to a register(s) and/or memory), for example, so those results are visible within a processor (e.g., visible outside of the execution circuit that produced those results).

One or more of these components (e.g., decoder 508, register rename/register allocator/scheduler 510, execution circuit 514, registers (e.g., register file)/memory 512, or write back circuit 518) may be in a single core of a hardware processor (e.g., and multiple cores each with an instance of these components).

In certain embodiments, to support an array of compute circuits (e.g., a dense compute array (DA)) an ISA includes one or more of the following instructions (e.g., that control a DMA engine): (i) an instruction (e.g., having a mnemonic of μdma.in) that initiates the movement of data from local memory locations into the array of compute circuits, and/or (ii) an instruction (e.g., having a mnemonic of μdma.out) that receives result data from the array of compute circuits and moves it into a local memory location. Example formats of these instructions are shown in Table 1 below.

TABLE 1

Example udma.in instruction and udma.out instruction definitions

| Instruction | Fields (e.g., ASM Form Arguments) | Field (e.g., Argument) Descriptions |
| --- | --- | --- |
| μdma.in | r1, r2, r3, r4, r5, config_num, T/R, M/U, R/C | r1 = rSrc; r2 = array_width; r3 = count; r4 = init_delay; r5 = init_val |
| μdma.out | r1, r2, r3, r4, config_num, T/R, R/C | r1 = rDst; r2 = array_width; r3 = count; r4 = init_delay |

In certain embodiments, the rSrc/rDst field indicates the base address of (i) the source memory for μdma.in or (ii) the destination memory for μdma.out. In certain embodiments, the array_width field indicates the number of elements in a single (1D) array (e.g., vector), for example, a row (if row major) or column (if column major) of the input or output matrix, respectively. In certain embodiments, the count field indicates the total number of arrays (e.g., vectors) to be pushed into or pulled out of the array of compute circuits. In certain embodiments, the initial delay (init_delay) field indicates the initial delay (e.g., adjusted per port) to synchronize the data input and output patterns, e.g., when the array of compute circuits is in systolic mode. In certain embodiments, the initial value (init_val) field indicates the data value to be pushed into the array of processing elements while in the initial delay phase. This value may change depending on the operation type that is to be performed in the compute circuit(s), for example, with the goal being to maintain functional correctness of the operations while in the initial delay phase. In certain embodiments, the configuration number (config_num) indicates the operation(s) to be performed by the array of compute circuits, e.g., as an array configuration seed value that the micro-DMA engine will reference with its request. In certain embodiments, the config_num is transported (e.g., as metadata) with the data through the array of compute circuits. In one embodiment, the seed value sets the array mesh connectivity and computes the operation type (op-type) for the request. In certain embodiments, the Top/Right (T/R) field indicates (e.g., via one-bit) which group of array ports (e.g., top being the columns and right being the rows) that the μdma.in or μdma.out instruction is targeting. In certain embodiments, the Multicast/Unicast (M/U) field indicates the array (e.g., internal mesh network connectivity) mode, for example, with this affecting the request pattern that the μDMA engine will send to the array when executing an μdma.in instruction. In certain embodiments, the Row/Column (R/C) field indicates the organization of the source/destination data structures as row major or column major, respectively, for example, with this affecting the method of per-element address generation that the μDMA engine implements when executing an μdma.in or μdma.out instruction.

In certain embodiments, decoder circuit and/or execution circuit for an instruction is in a single thread pipeline (STP) or multiple thread pipeline (MTP) of FIG. 8.

Figure 6:
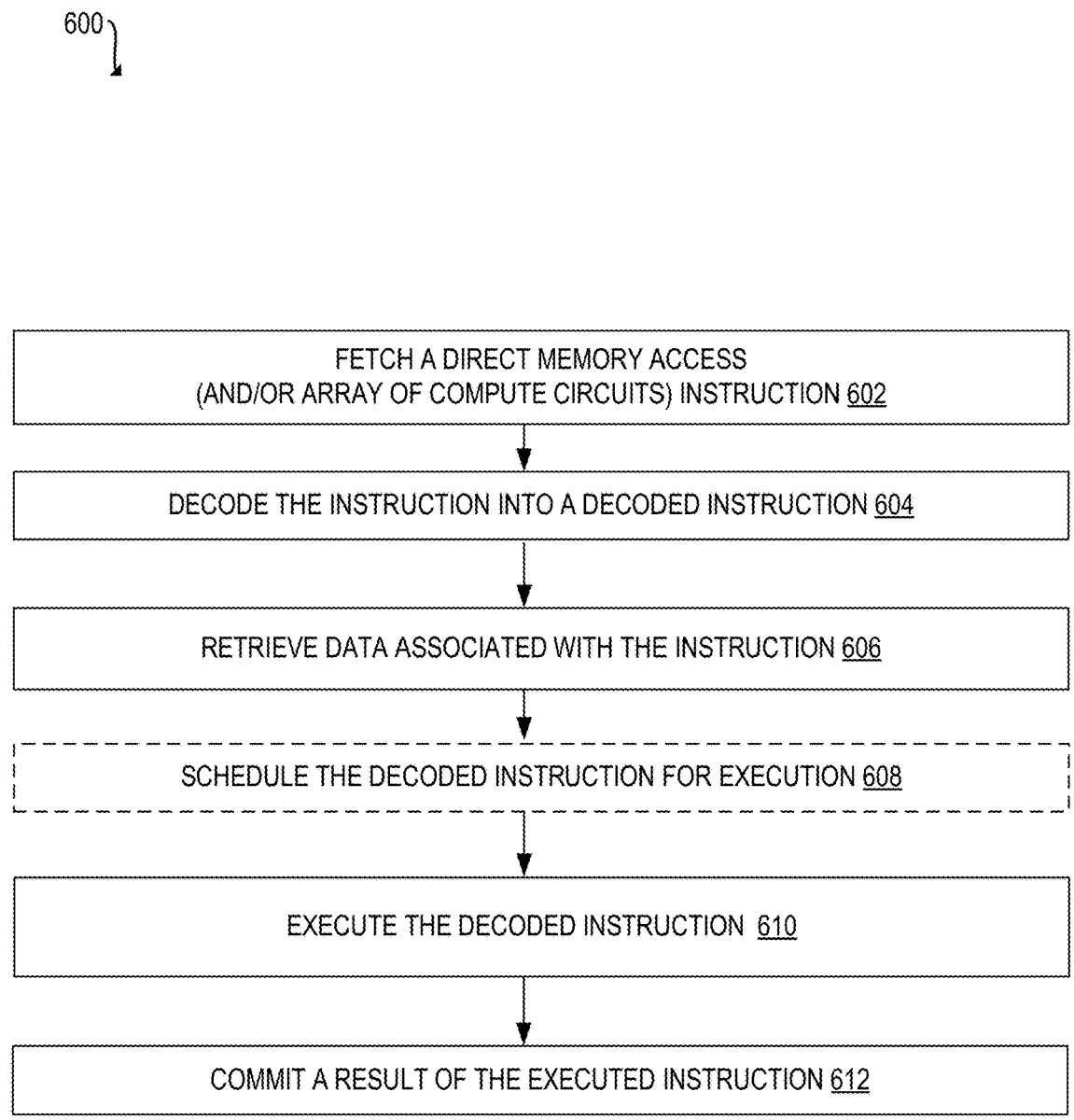
FIG. 6 is a flow diagram illustrating operations of a method for processing a direct memory access instruction according to embodiments of the disclosure.

FIG. 6 is a flow diagram illustrating operations 600 of a method for processing a direct memory access (and/or array of compute circuits) instruction according to embodiments of the disclosure. A processor (e.g., or processor core) may perform operations 600 of method, e.g., in response to receiving a request to execute an instruction from software. Depicted operations 600 includes processing a "a direct memory access (and/or array of compute circuits)" instruction by performing a: fetch of an instruction (e.g., having an instruction opcode corresponding to the direct memory access (and/or array of compute circuits) instruction 602, decode of the instruction into a decoded instruction 604, retrieve data associated with the instruction 606, (optionally) schedule the decoded instruction for execution 608, execute the decoded instruction to enqueue a job in an accelerator circuit 610, and commit a result of the executed instruction 612.

Figure 7:
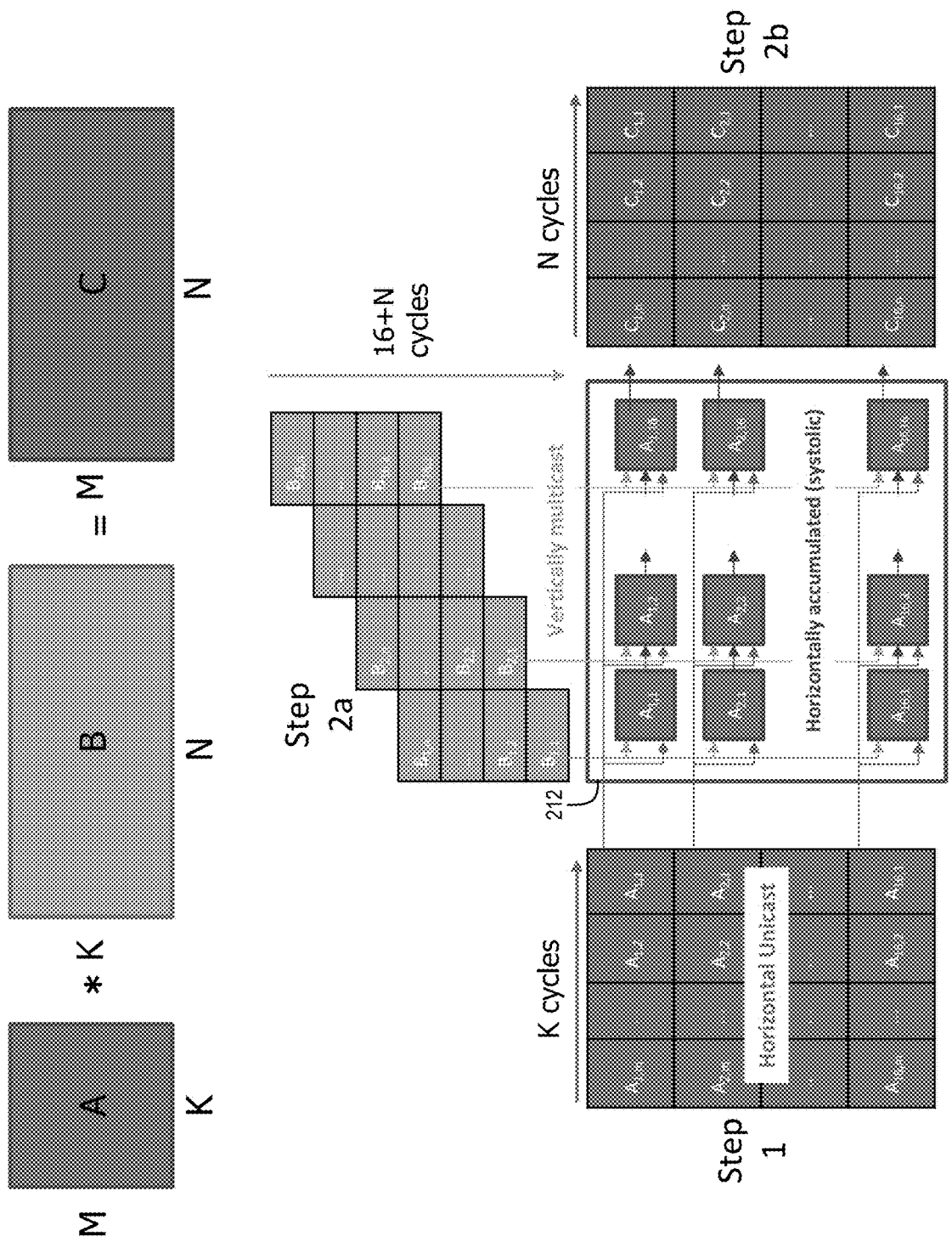
FIG. 7 is a diagram illustrating performing a matrix multiply with an array of compute circuit using a plurality of direct memory access instructions according to embodiments of the disclosure.

FIG. 7 is a diagram illustrating performing a matrix multiply with an array of compute circuit using a plurality of direct memory access instructions according to embodiments of the disclosure. As depicted, matrix [A] (having dimensions of M by K) is to be multiplied by matrix [B] (having dimensions of K by N) to generate a resultant matrix [C] (having dimensions of M by N), e.g., where M, K, and N are each integer values or 1 or more (e.g., 2 or more).

FIG. 7 illustrates the multiply as the data is pushed in (and flows out) during each step. In certain embodiments, the multiply takes two steps of μDMA instruction inputs to complete, for example (i) where the first step pushes matrix A into the array to be held as the stationary input (for example, using a single μdma.in instruction specifying a unicast operation where array_width=M, count=K, and Top/Right specifies "Right", e.g., with no initial delay needed for array synchronization), and (ii) where the second step pushes N rows of matrix B vertically through the array, e.g., and as the data flows through the compute array, the result is accumulated horizontally (e.g., systolically) and pulled out of the horizontal buses. In certain embodiments, step 2a is a μdma.in multicast instruction where array width=K, count=N, and Top/Right specifies "Top", e.g., and where there is an init_delay of the latency of an FMA operation, so that the input ports are synchronized (e.g., each port waits an additional time period of init_delay before pushing their first value). In certain embodiments, step 2b is a μdma.out instruction where the array width=K, and count=N.

An ISA may include one or more other instructions, e.g., DMA copy instructions. For example, in reference to FIG. 2, a DMA copy instruction to cause DMA engine 220 to copy data from an external memory (e.g., via memory interface 222) into scratch pad memory 216).

In certain embodiments, a kernel (e.g., to be executed at least in part by circuitry of hardware processor core 200 in FIG. 2), includes performing the following: (1) dma.copy to copy matrix A from memory (e.g., by DMA engine 220 for external memory) to internal memory (e.g., SPAD 216), (2a) udma.in (e.g., in time-interleaved unicast mode) to load matrix A (e.g., by micro-DMA engine 214) into array of compute circuits (e.g., array 212) from internal memory (e.g., SPAD 216), (2b) dma.copy to copy matrix B from memory (e.g., by DMA engine 220 for external memory) to internal memory (e.g., SPAD 216), (3a) udma.in (e.g., in multicast mode) to load matrix B (e.g., by micro-DMA engine 214) into array of compute circuits (e.g., array 212) from internal memory (e.g., SPAD 216), (3b) udma.out to store matrix C into internal memory (e.g., SPAD 216) from output(s) of array of compute circuits (e.g., array 212), and (4) dma.copy to copy matrix C from internal memory (e.g., SPAD 216) to memory (e.g., by DMA engine 220 for external memory).

FIG. 8 illustrates a block diagram of a second type of hardware processor core 800 comprising a plurality of single thread pipelines (STP) and a plurality of multiple thread pipelines (MTP) according to embodiments of the disclosure. In certain embodiments, MTPs are round-robin multi-threaded in-order pipelines, for example, and at any moment, each thread can only have one in-flight instruction, which considerably simplifies the core design for better energy efficiency. In certain embodiments, STPs are used for single thread performance sensitive tasks, such as memory and thread management threads (e.g., from the operating system). For example, where these are in-order stall-on-use pipelines that are able to exploit some instruction and memory-level parallelism, while avoiding the high-power consumption of aggressive out-or-order pipelines. Second type of core 800 and first type of core 200 in FIG. 2 implement the same instruction set in certain embodiments.

In certain embodiments, each core has a (e.g., small) data cache (D$) and instruction cache (I$), and a register file (RF) to support its thread count. In certain embodiments, because of the low locality in graph workloads, no higher cache levels are included, avoiding useless chip area and power consumption of large caches. For scalability, caches are not coherent across the whole system in certain embodiments, e.g., it is the responsibility of the programmer to avoid modifying shared data that is cached, or to flush caches if required for correctness. In certain embodiments, MTPs and STPs are grouped into blocks, each of which has a (e.g., large) local scratchpad (SPAD) for low latency storage. In certain embodiments, programmers are responsible for selecting which memory accesses to cache (e.g., local stack), which to put on SPAD (e.g., often reused data structures or the result of a DMA gather operation), and which not to store locally. In certain embodiments, there are no prefetchers to avoid useless data fetches and to limit power consumption, e.g., a DMA (e.g., offload) engines can be used to efficiently fetch large chunks of useful data.

In certain embodiments, a DMA engine performs operations such as (e.g., strided) copy, scatter, and gather. In certain embodiments, queue engines (QENG) are responsible for maintaining queues allocated in shared memory, alleviating the core from atomic inserts and removals. They can be used for work stealing algorithms and dynamically partitioning the workload. In certain embodiments, collective engines (CENG) implement efficient system-wide reductions and barriers, for example, where remote atomics perform atomic operations at the memory controller where the data is located, instead of burdening the pipeline with first locking the data, moving the data to the core, updating it, writing back, and unlocking. This enables efficient and scalable synchronization, which is indispensable for the high thread count. In certain embodiments, the engines are directed by the core using specific instructions, for example, where these instructions are non-blocking, enabling the cores to perform other work while the operation is done in the background. Custom polling and waiting instructions are used to synchronize the threads and offloaded computations in certain embodiments.

In certain embodiments, parse and irregular accesses to a large data structure are typical for graph analysis applications. Therefore, accesses to remote memory should be done with minimal overhead. Embodiments herein implement a hardware distributed global address space (DGAS), which enables each core to uniformly access memory across the full system (e.g., multiple nodes) with one address space. Besides avoiding the overhead of setting up communication for remote accesses, a DGAS also greatly simplifies programming, because there is no implementation difference between accessing local and remote memory. In certain embodiments, address translation tables (ATT) contain programmable rules to translate application memory addresses to physical locations, to arrange the address space to the need of the application (e.g., address interleaved, block partitioned, etc.). In certain embodiments, the memory controllers (e.g., one per block) are designed to support native (e.g., 8-byte) accesses, while supporting standard cache line accesses as well. In certain embodiments, fetching only the data that is actually needed reduces memory bandwidth pressure and utilizes the available bandwidth more efficiently.

The circuitry discussed herein, e.g., one or more of the components in core 200 in FIG. 2, may be implement within a hardware accelerator.

Figure 9:
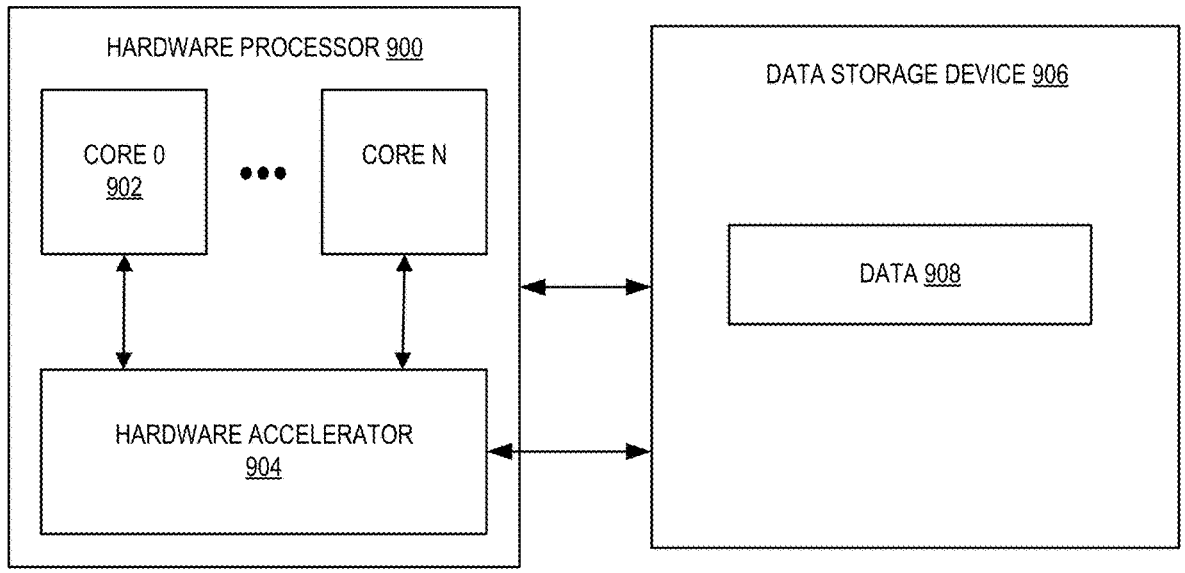
FIG. 9 illustrates a hardware processor having a hardware accelerator according to embodiments of the disclosure.

FIG. 9 illustrates a hardware processor having a hardware accelerator according to embodiments of the disclosure. Hardware processor 900 (e.g., core 902) may receive a request (e.g., from software) to perform a thread (e.g., operation) and may offload (e.g., at least part of) the thread (e.g., operation) to hardware accelerator 904. Hardware processor 900 may include one or more cores (0 to N). In one embodiment, each core may communicate with (e.g., be coupled to) hardware decompression accelerator 904. In one embodiment, each core may communicate with (e.g., be coupled to) one of multiple hardware decompression accelerators. Core(s), accelerator(s), and data storage device 906 may communicate (e.g., be coupled) with each other. Arrows indicate two-way communication (e.g., to and from a component), but one way communication may be used. In one embodiment, a (e.g., each) core may communicate (e.g., be coupled) with the data storage device, for example, storing and/or outputting data 908. Hardware accelerator may include any hardware (e.g., circuit or circuitry) discussed herein. In one embodiment, an (e.g., each) accelerator may communicate (e.g., be coupled) with the data storage device.

Figure 10:
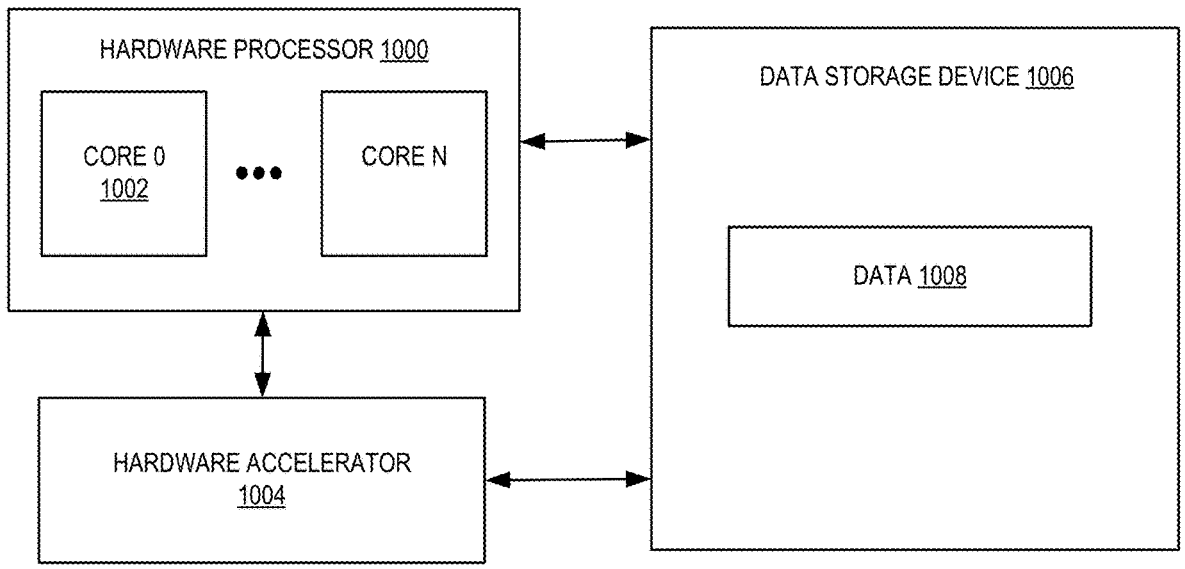
FIG. 10 illustrates a hardware processor coupled to a hardware accelerator according to embodiments of the disclosure.

FIG. 10 illustrates a hardware processor 1000 coupled to a hardware accelerator 1004 according to embodiments of the disclosure. In one embodiment, a hardware accelerator is on die with a hardware processor. In one embodiment, a hardware accelerator is off die of a hardware processor. In one embodiment, system including at least a hardware processor 1000 and a hardware accelerator 1004 are a system on a chip (SoC). Hardware processor 1000 (e.g., core 1002) may receive a request (e.g., from software) to perform a thread (e.g., operation) and may offload (e.g., at least part of) the thread (e.g., operation) to hardware accelerator 1004.

Hardware processor 1000 may include one or more cores (0 to N). In one embodiment, each core may communicate with (e.g., be coupled to) hardware accelerator 1004. In one embodiment, each core may communicate with (e.g., be coupled to) one of multiple hardware accelerators. Core(s), accelerator(s), and data storage device 1006 may communicate (e.g., be coupled) with each other. Arrows indicate two-way communication (e.g., to and from a component), but one way communication may be used. In one embodiment, a (e.g., each) core may communicate (e.g., be coupled) with the data storage device, for example, storing and/or outputting data 1008. Hardware accelerator may include any hardware (e.g., circuit or circuitry) discussed herein. In one embodiment, an (e.g., each) accelerator may communicate (e.g., be coupled) with the data storage device, for example, to receive data. Data 1008 (e.g., data stream) may be previously loaded into data storage device 1006, e.g., by a hardware accelerator or a hardware processor.

Exemplary architectures, systems, etc. that the above may be used in are detailed below. Exemplary instruction formats (e.g., for a µdma.in instruction and/or a µdma.out instruction) are detailed below.

At least some embodiments of the disclosed technologies can be described in view of the following examples:

Example 1. An Apparatus Comprising a two-dimensional grid of compute circuits;

a memory;

a direct memory access circuit coupled to the memory and the two-dimensional grid of compute circuits;

a decoder circuit to decode a single instruction into a decoded single instruction, the single instruction including a first field to identify a base address of two-dimensional data in the memory, a second field to identify a number of elements in each one-dimensional array of the two-dimensional data, a third field to identify a number of one-dimensional arrays of the two-dimensional data, a fourth field to identify an operation to be performed by the two-dimensional grid of compute circuits, and a fifth field to indicate the direct memory access circuit is to move the two-dimensional data indicated by the first field, the second field, and the third field into the two-dimensional grid of compute circuits and the two-dimensional grid of compute circuits is to perform the operation on the two-dimensional data according to the fourth field; and an execution circuit to execute the decoded single instruction according to the fields.

Example 2. The apparatus of example 1, wherein the single instruction further comprises a field to indicate a delay time to wait before pushing first values of the two-dimensional data to each corresponding input port of the two-dimensional grid of compute circuits.

Example 3. The apparatus of example 2, wherein the single instruction further comprises a field to indicate a data value that is to be pushed into each corresponding input port of the two-dimensional grid of compute circuits during the delay time.

Example 4. The apparatus of example 1, wherein the single instruction further comprises a field that when set to a first value causes the two-dimensional data to be sent to a first proper subset of input ports of the two-dimensional grid of compute circuits, and when set to a second different value causes the two-dimensional data to be sent to a second different proper subset of input ports of the two-dimensional grid of compute circuits.

Example 5. The apparatus of example 1, wherein the single instruction further comprises a field that when set to a multicast value causes a single element of the two-dimensional data to be sent to a plurality of compute circuits of the two-dimensional grid of compute circuits.

Example 6. The apparatus of example 1, wherein a value from the fourth field that identifies the operation is passed from a first compute circuit to a second compute circuit of the two-dimensional grid of compute circuits.

Example 7. The apparatus of example 1, wherein the single instruction further comprises a field that when set to a first value indicates the direct memory access circuit is to perform address generation for each element of the two-dimensional data as row major, and when set to a second different value indicates the direct memory access circuit is to perform the address generation for each element of the two-dimensional data as column major.

Example 8. The apparatus of example 1, wherein:

the decoder circuit is to decode a second single instruction into a decoded second single instruction, the second single instruction including a first field to identify a base address for two-dimensional data to be stored in the memory, a second field to identify a number of elements in each one-dimensional array of the two-dimensional data to be stored in the memory, a third field to identify a number of one-dimensional arrays of the two-dimensional data to be stored in the memory, a fourth field to indicate the direct memory access circuit is to move the two-dimensional data indicated by the first field, the second field, and the third field from the two-dimensional grid of compute circuits into the memory; and the execution circuit to execute the decoded second single instruction according to the fields.

Example 9. A method comprising:

decoding a single instruction with a decoder circuit, of a processor comprising a two-dimensional grid of compute circuits, a memory, and a direct memory access circuit coupled to the memory and the two-dimensional grid of compute circuits, into a decoded single instruction, the single instruction including a first field to identify a base address of two-dimensional data in the memory, a second field to identify a number of elements in each one-dimensional array of the two-dimensional data, a third field to identify a number of one-dimensional arrays of the two-dimensional data, a fourth field to identify an operation to be performed by the two-dimensional grid of compute circuits, and a fifth field to indicate the direct memory access circuit is to move the two-dimensional data indicated by the first field, the second field, and the third field into the two-dimensional grid of compute circuits and the two-dimensional grid of compute circuits is to perform the operation on the two-dimensional data according to the fourth field; and executing the decoded single instruction with an execution circuit of the processor according to the fields.

Example 10. The method of example 9, wherein the single instruction further comprises a field to indicate a delay time to wait before pushing first values of the two-dimensional data to each corresponding input port of the two-dimensional grid of compute circuits.

Example 11. The method of example 10, wherein the single instruction further comprises a field to indicate a data value that is to be pushed into each corresponding input port of the two-dimensional grid of compute circuits during the delay time.

Example 12. The method of example 9, wherein the single instruction further comprises a field that when set to a first value causes the two-dimensional data to be sent to a first proper subset of input ports of the two-dimensional grid of compute circuits, and when set to a second different value causes the two-dimensional data to be sent to a second different proper subset of input ports of the two-dimensional grid of compute circuits.

Example 13. The method of example 9, wherein the single instruction further comprises a field that when set to a multicast value causes a single element of the two-dimensional data to be sent to a plurality of compute circuits of the two-dimensional grid of compute circuits.

Example 14. The method of example 9, wherein a value from the fourth field that identifies the operation is passed from a first compute circuit to a second compute circuit of the two-dimensional grid of compute circuits.

Example 15. The method of example 9, wherein the single instruction further comprises a field that when set to a first value indicates the direct memory access circuit is to perform address generation for each element of the two-dimensional data as row major, and when set to a second different value indicates the direct memory access circuit is to perform the address generation for each element of the two-dimensional data as column major.

Example 16. The method of example 9, further comprising:
decoding a second single instruction with the decoder circuit into a decoded second single instruction, the second single instruction including a first field to identify a base address for two-dimensional data to be stored in the memory, a second field to identify a number of elements in each one-dimensional array of the two-dimensional data to be stored in the memory, a third field to identify a number of one-dimensional arrays of the two-dimensional data to be stored in the memory, a fourth field to indicate the direct memory access circuit is to move the two-dimensional data indicated by the first field, the second field, and the third field from the two-dimensional grid of compute circuits into the memory; and
executing the decoded second single instruction with the execution circuit according to the fields.

Example 17. An apparatus comprising:
a first type of hardware processor core comprising:
  a two-dimensional grid of compute circuits,
  a memory, and
  a direct memory access circuit coupled to the memory and the two-dimensional grid of compute circuits; and
a second different type of hardware processor core coupled to the first type of hardware processor core and comprising:
  a decoder circuit to decode a single instruction into a decoded single instruction, the single instruction including a first field to identify a base address of two-dimensional data in the memory, a second field to identify a number of elements in each one-dimensional array of the two-dimensional data, a third field to identify a number of one-dimensional arrays of the two-dimensional data, a fourth field to identify an operation to be performed by the two-dimensional grid of compute circuits, and a fifth field to indicate the direct memory access circuit is to move the two-dimensional data indicated by the first field, the second field, and the third field into the two-dimensional grid of compute circuits and the two-dimensional grid of compute circuits is to perform the operation on the two-dimensional data according to the fourth field, and
  an execution circuit to execute the decoded single instruction according to the fields.

Example 18. The apparatus of example 17, wherein the single instruction further comprises a field to indicate a delay time to wait before pushing first values of the two-dimensional data to each corresponding input port of the two-dimensional grid of compute circuits.

Example 19. The apparatus of example 18, wherein the single instruction further comprises a field to indicate a data value that is to be pushed into each corresponding input port of the two-dimensional grid of compute circuits during the delay time.

Example 20. The apparatus of example 17, wherein the single instruction further comprises a field that when set to a first value causes the two-dimensional data to be sent to a first proper subset of input ports of the two-dimensional grid of compute circuits, and when set to a second different value causes the two-dimensional data to be sent to a second different proper subset of input ports of the two-dimensional grid of compute circuits.

Example 21. The apparatus of example 17, wherein the single instruction further comprises a field that when set to a multicast value causes a single element of the two-dimensional data to be sent to a plurality of compute circuits of the two-dimensional grid of compute circuits.

Example 22. The apparatus of example 17, wherein a value from the fourth field that identifies the operation is passed from a first compute circuit to a second compute circuit of the two-dimensional grid of compute circuits.

Example 23. The apparatus of example 17, wherein the single instruction further comprises a field that when set to a first value indicates the direct memory access circuit is to perform address generation for each element of the two-dimensional data as row major, and when set to a second different value indicates the direct memory access circuit is to perform the address generation for each element of the two-dimensional data as column major.

Example 24. The apparatus of example 17, wherein:
the decoder circuit is to decode a second single instruction into a decoded second single instruction, the second single instruction including a first field to identify a base address for two-dimensional data to be stored in the memory, a second field to identify a number of elements in each one-dimensional array of the two-dimensional data to be stored in the memory, a third field to identify a number of one-dimensional arrays of the two-dimensional data to be stored in the memory, a fourth field to indicate the direct memory access circuit is to move the two-dimensional data indicated by the first field, the second field, and the third field from the two-dimensional grid of compute circuits into the memory; and
the execution circuit to execute the decoded second single instruction according to the fields.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 11A:
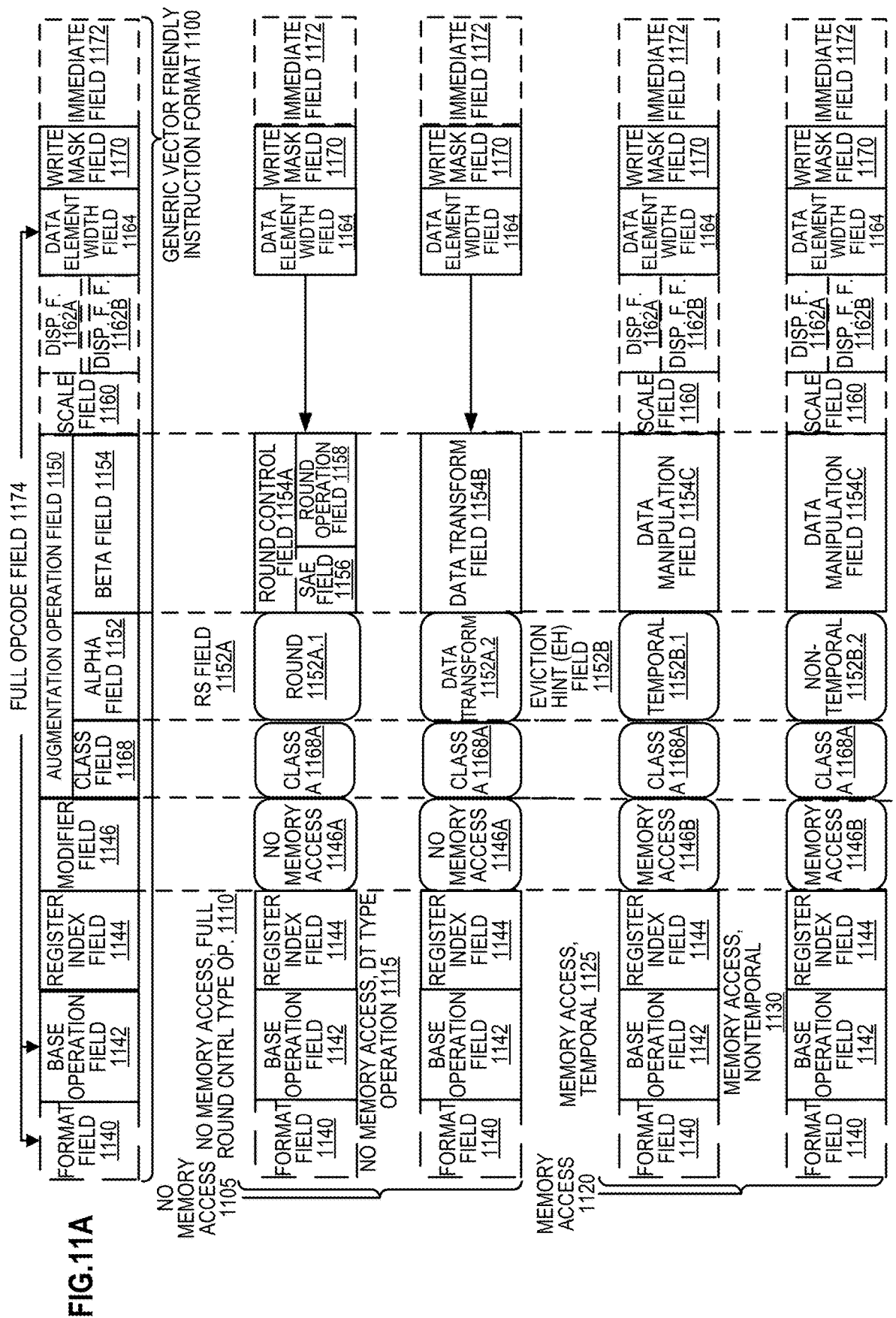
FIG. 11A is a block diagram illustrating a generic vector friendly instruction format and class A instruction templates thereof according to embodiments of the disclosure.
Figure 11B:
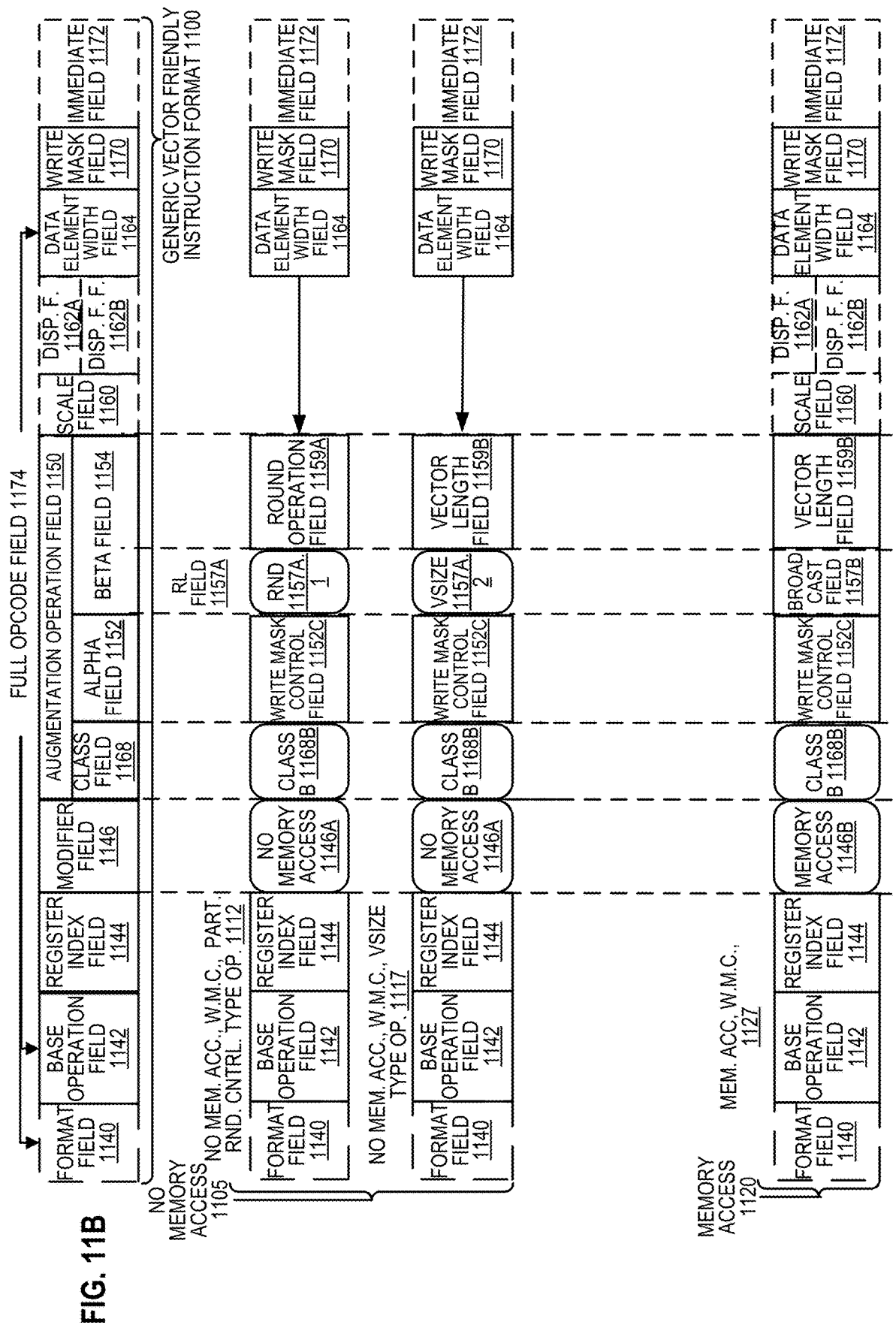
FIG. 11B is a block diagram illustrating the generic vector friendly instruction format and class B instruction templates thereof according to embodiments of the disclosure.

FIGS. 11A-11B are block diagrams illustrating a generic vector friendly instruction format and instruction templates thereof according to embodiments of the disclosure. FIG. 11A is a block diagram illustrating a generic vector friendly instruction format and class A instruction templates thereof according to embodiments of the disclosure; while FIG. 11B is a block diagram illustrating the generic vector friendly instruction format and class B instruction templates thereof according to embodiments of the disclosure. Specifically, a generic vector friendly instruction format 1100 for which are defined class A and class B instruction templates, both of which include no memory access 1105 instruction templates and memory access 1120 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 11A include: 1) within the no memory access 1105 instruction templates there is shown a no memory access, full round control type operation 1110 instruction template and a no memory access, data transform type operation 1115 instruction template; and 2) within the memory access 1120 instruction templates there is shown a memory access, temporal 1125 instruction template and a memory access, non-temporal 1130 instruction template. The class B instruction templates in FIG. 11B include: 1) within the no memory access 1105 instruction templates there is shown a no memory access, write mask control, partial round control type operation 1112 instruction template and a no memory access, write mask control, vsize type operation 1117 instruction template; and 2) within the memory access 1120 instruction templates there is shown a memory access, write mask control 1127 instruction template.

The generic vector friendly instruction format 1100 includes the following fields listed below in the order illustrated in FIGS. 11A-11B.

Format field 1140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1142— its content distinguishes different base operations.

Register index field 1144— its content, directly or through address generation, specifies the locations of the source and destination operands, be they in registers or in memory. These include a sufficient number of bits to select N registers from a P×Q (e.g., 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1146— its content distinguishes occurrences of instructions in the generic vector instruction format that specify memory access from those that do not; that is, between no memory access 1105 instruction templates and memory access 1120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1150— its content distinguishes which one of a variety of different operations to be performed in addition to the base operation. This field is context specific. In one embodiment of the disclosure, this field is divided into a class field 1168, an alpha field 1152, and a beta field 1154. The augmentation operation field 1150 allows common groups of operations to be performed in a single instruction rather than 2, 3, or 4 instructions.

Scale field 1160— its content allows for the scaling of the index field's content for memory address generation (e.g., for address generation that uses $2^{scale}$*index+base).

Displacement Field 1162A— its content is used as part of memory address generation (e.g., for address generation that uses $2^{scale}$*index+displacement).

Displacement Factor Field 1162B (note that the juxtaposition of displacement field 1162A directly over displacement factor field 1162B indicates one or the other is used)— its content is used as part of address generation; it specifies a displacement factor that is to be scaled by the size of a memory access (N)— where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1174 (described later herein) and the data manipulation field 1154C. The displacement field 1162A and the displacement factor field 1162B are optional in the sense that they are not used for the no memory access 1105 instruction templates and/or different embodiments may implement only one or none of the two.

Data element width field 1164— its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1170— its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1170 allows for partial vector operations, including loads, stores, arithmetic, logical, etc. While embodiments of the disclosure are described in which the write mask field's 1170 content selects one of a number of write mask registers that contains the write mask to be used (and thus the write mask field's 1170 content indirectly identifies that masking to be performed), alternative embodiments instead or additional allow the mask write field's 1170 content to directly specify the masking to be performed.

Immediate field 1172— its content allows for the specification of an immediate. This field is optional in the sense that is it not present in an implementation of the generic vector friendly format that does not support immediate and it is not present in instructions that do not use an immediate.

Class field 1168— its content distinguishes between different classes of instructions. With reference to FIGS. 11A-B, the contents of this field select between class A and class B instructions. In FIGS. 11A-B, rounded corner squares are used to indicate a specific value is present in a field (e.g., class A 1168A and class B 1168B for the class field 1168 respectively in FIGS. 11A-B).

Instruction Templates of Class A

In the case of the non-memory access 1105 instruction templates of class A, the alpha field 1152 is interpreted as an RS field 1152A, whose content distinguishes which one of the different augmentation operation types are to be performed (e.g., round 1152A.1 and data transform 1152A.2 are respectively specified for the no memory access, round type operation 1110 and the no memory access, data transform type operation 1115 instruction templates), while the beta field 1154 distinguishes which of the operations of the specified type is to be performed. In the no memory access 1105 instruction templates, the scale field 1160, the displacement field 1162A, and the displacement scale filed 1162B are not present.

No-Memory Access Instruction Templates—Full Round Control Type Operation

In the no memory access full round control type operation 1110 instruction template, the beta field 1154 is interpreted as a round control field 1154A, whose content(s) provide static rounding. While in the described embodiments of the disclosure the round control field 1154A includes a suppress all floating-point exceptions (SAE) field 1156 and a round operation control field 1158, alternative embodiments may support may encode both these concepts into the same field or only have one or the other of these concepts/fields (e.g., may have only the round operation control field 1158).

SAE field 1156— its content distinguishes whether or not to disable the exception event reporting; when the SAE field's 1156 content indicates suppression is enabled, a given instruction does not report any kind of floating-point exception flag and does not raise any floating-point exception handler.

Round operation control field 1158— its content distinguishes which one of a group of rounding operations to perform (e.g., Round-up, Round-down, Round-towards-zero and Round-to-nearest). Thus, the round operation control field 1158 allows for the changing of the rounding mode on a per instruction basis. In one embodiment of the disclosure where a processor includes a control register for specifying rounding modes, the round operation control field's 1150 content overrides that register value.

No Memory Access Instruction Templates—Data Transform Type Operation

In the no memory access data transform type operation 1115 instruction template, the beta field 1154 is interpreted as a data transform field 1154B, whose content distinguishes which one of a number of data transforms is to be performed (e.g., no data transform, swizzle, broadcast).

In the case of a memory access 1120 instruction template of class A, the alpha field 1152 is interpreted as an eviction hint field 1152B, whose content distinguishes which one of the eviction hints is to be used (in FIG. 11A, temporal 1152B.1 and non-temporal 1152B.2 are respectively specified for the memory access, temporal 1125 instruction template and the memory access, non-temporal 1130 instruction template), while the beta field 1154 is interpreted as a data manipulation field 1154C, whose content distinguishes which one of a number of data manipulation operations (also known as primitives) is to be performed (e.g., no manipulation; broadcast; up conversion of a source; and down conversion of a destination). The memory access 1120 instruction templates include the scale field 1160, and optionally the displacement field 1162A or the displacement scale field 1162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1152 is interpreted as a write mask control (Z) field 1152C, whose content distinguishes whether the write masking controlled by the write mask field 1170 should be a merging or a zeroing.

In the case of the non-memory access 1105 instruction templates of class B, part of the beta field 1154 is interpreted as an RL field 1157A, whose content distinguishes which one of the different augmentation operation types are to be performed (e.g., round 1157A.1 and vector length (VSIZE) 1157A.2 are respectively specified for the no memory access, write mask control, partial round control type operation 1112 instruction template and the no memory access, write mask control, VSIZE type operation 1117 instruction template), while the rest of the beta field 1154 distinguishes which of the operations of the specified type is to be performed. In the no memory access 1105 instruction templates, the scale field 1160, the displacement field 1162A, and the displacement scale filed 1162B are not present.

In the no memory access, write mask control, partial round control type operation 1110 instruction template, the rest of the beta field 1154 is interpreted as a round operation field 1159A and exception event reporting is disabled (a given instruction does not report any kind of floating-point exception flag and does not raise any floating-point exception handler).

Round operation control field 1159A— just as round operation control field 1158, its content distinguishes which one of a group of rounding operations to perform (e.g., Round-up, Round-down, Round-towards-zero and Round-to-nearest). Thus, the round operation control field 1159A allows for the changing of the rounding mode on a per instruction basis. In one embodiment of the disclosure where a processor includes a control register for specifying rounding modes, the round operation control field's 1150 content overrides that register value.

In the no memory access, write mask control, VSIZE type operation 1117 instruction template, the rest of the beta field 1154 is interpreted as a vector length field 1159B, whose content distinguishes which one of a number of data vector lengths is to be performed on (e.g., 128, 256, or 512 byte).

In the case of a memory access 1120 instruction template of class B, part of the beta field 1154 is interpreted as a broadcast field 1157B, whose content distinguishes whether or not the broadcast type data manipulation operation is to be performed, while the rest of the beta field 1154 is interpreted the vector length field 1159B. The memory access 1120 instruction templates include the scale field 1160, and optionally the displacement field 1162A or the displacement scale field 1162B.

With regard to the generic vector friendly instruction format 1100, a full opcode field 1174 is shown including the format field 1140, the base operation field 1142, and the data element width field 1164. While one embodiment is shown where the full opcode field 1174 includes all of these fields, the full opcode field 1174 includes less than all of these fields in embodiments that do not support all of them. The full opcode field 1174 provides the operation code (opcode).

The augmentation operation field 1150, the data element width field 1164, and the write mask field 1170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high-performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general-purpose cores, one of the graphics cores intended primarily for graphics and/or scientific computing may support only class A, while one or more of the general-purpose cores may be high-performance general-purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 12 is a block diagram illustrating an exemplary specific vector friendly instruction format according to embodiments of the disclosure. FIG. 12 shows a specific vector friendly instruction format 1200 that is specific in the sense that it specifies the location, size, interpretation, and order of the fields, as well as values for some of those fields. The specific vector friendly instruction format 1200 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 11 into which the fields from FIG. 12 map are illustrated.

It should be understood that, although embodiments of the disclosure are described with reference to the specific vector friendly instruction format 1200 in the context of the generic vector friendly instruction format 1100 for illustrative purposes, the disclosure is not limited to the specific vector friendly instruction format 1200 except where claimed. For example, the generic vector friendly instruction format 1100 contemplates a variety of possible sizes for the various fields, while the specific vector friendly instruction format 1200 is shown as having fields of specific sizes. By way of specific example, while the data element width field 1164 is illustrated as a one bit field in the specific vector friendly instruction format 1200, the disclosure is not so limited (that is, the generic vector friendly instruction format 1100 contemplates other sizes of the data element width field 1164).

The generic vector friendly instruction format 1100 includes the following fields listed below in the order illustrated in FIG. 12A.

EVEX Prefix (Bytes 0-3) 1202—is encoded in a four-byte form.

Format Field 1140 (EVEX Byte 0, bits [7:0])—the first byte (EVEX Byte 0) is the format field 1140 and it contains 0x62 (the unique value used for distinguishing the vector friendly instruction format in one embodiment of the disclosure).

The second-fourth bytes (EVEX Bytes 1-3) include a number of bit fields providing specific capability.

REX field 1205 (EVEX Byte 1, bits [7-5])— consists of a EVEX.R bit field (EVEX Byte 1, bit [7]— R), EVEX.X bit field (EVEX byte 1, bit [6]— X), and 1157BEX byte 1, bit[5]— B). The EVEX.R, EVEX.X, and EVEX.B bit fields provide the same functionality as the corresponding VEX bit fields, and are encoded using is complement form, i.e. ZMMO is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1110— this is the first part of the REX' field 1110 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1215 (EVEX byte 1, bits [3:0]—mmmm)—its content encodes an implied leading opcode byte (OF, OF 38, or OF 3).

Data element width field 1164 (EVEX byte 2, bit [7]—W)—is represented by the notation EVEX.W. EVEX.W is used to define the granularity (size) of the datatype (either 32-bit data elements or 64-bit data elements).

EVEX.vvvv 1220 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1220 encodes the 4 low-order bits of the first source register specifier stored in inverted (1s complement) form. Depending on the instruction, an extra different EVEX bit field is used to extend the specifier size to 32 registers.

EVEX.U 1168 Class field (EVEX byte 2, bit [2]-U)— If EVEX.0=0, it indicates class A or EVEX.U0; if EVEX.0=1, it indicates class B or EVEX.U1.

Prefix encoding field 1225 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1152 (EVEX byte 3, bit [7]— EH; also known as EVEX.EH, EVEX.rs, EVEX.RL, EVEX.write mask control, and EVEX.N; also illustrated with α)—as previously described, this field is context specific.

Beta field 1154 (EVEX byte 3, bits [6:4]-SSS, also known as EVEX.$s_{2-0}$, EVEX.$r_{2-0}$, EVEX.rrl, EVEX.LL0, EVEX.LLB; also illustrated with PP(3)— as previously described, this field is context specific.

REX' field 1110— this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1170 (EVEX byte 3, bits [2:0]-kkk)—its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1230 (Byte 4) is also known as the opcode byte. Part of the opcode is specified in this field.

MOD R/M Field 1240 (Byte 5) includes MOD field 1242, Reg field 1244, and R/M field 1246. As previously described, the MOD field's 1242 content distinguishes between memory access and non-memory access operations. The role of Reg field 1244 can be summarized to two situations: encoding either the destination register operand or a source register operand, or be treated as an opcode extension and not used to encode any instruction operand. The role of RIM field 1246 may include the following: encoding the instruction operand that references a memory address, or encoding either the destination register operand or a source register operand.

Scale, Index, Base (SIB) Byte (Byte 6)—As previously described, the scale field's 1150 content is used for memory address generation. SIB.xxx 1254 and SIB.bbb 1256— the contents of these fields have been previously referred to with regard to the register indexes Xxxx and Bbbb.

Displacement field 1162A (Bytes 7-10)— when MOD field 1242 contains 10, bytes 7-10 are the displacement field 1162A, and it works the same as the legacy 32-bit displacement (disp32) and works at byte granularity.

Displacement factor field 1162B (Byte 7)— when MOD field 1242 contains 01, byte 7 is the displacement factor field 1162B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1162B is a reinterpretation of disp8; when using displacement factor field 1162B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1162B substitutes the legacy x86 instruction set 8-bit displacement. Thus, the displacement factor field 1162B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1172 operates as previously described.

Full Opcode Field

FIG. 12B is a block diagram illustrating the fields of the specific vector friendly instruction format 1200 that make up the full opcode field 1174 according to one embodiment of the disclosure. Specifically, the full opcode field 1174 includes the format field 1140, the base operation field 1142, and the data element width (W) field 1164. The base operation field 1142 includes the prefix encoding field 1225, the opcode map field 1215, and the real opcode field 1230.

Register Index Field

FIG. 12C is a block diagram illustrating the fields of the specific vector friendly instruction format 1200 that make up the register index field 1144 according to one embodiment of the disclosure. Specifically, the register index field 1144 includes the REX field 1205, the REX' field 1210, the MODR/M.reg field 1244, the MODR/M.r/m field 1246, the VVVV field 1220, xxx field 1254, and the bbb field 1256.

Augmentation Operation Field

Figure 12D:
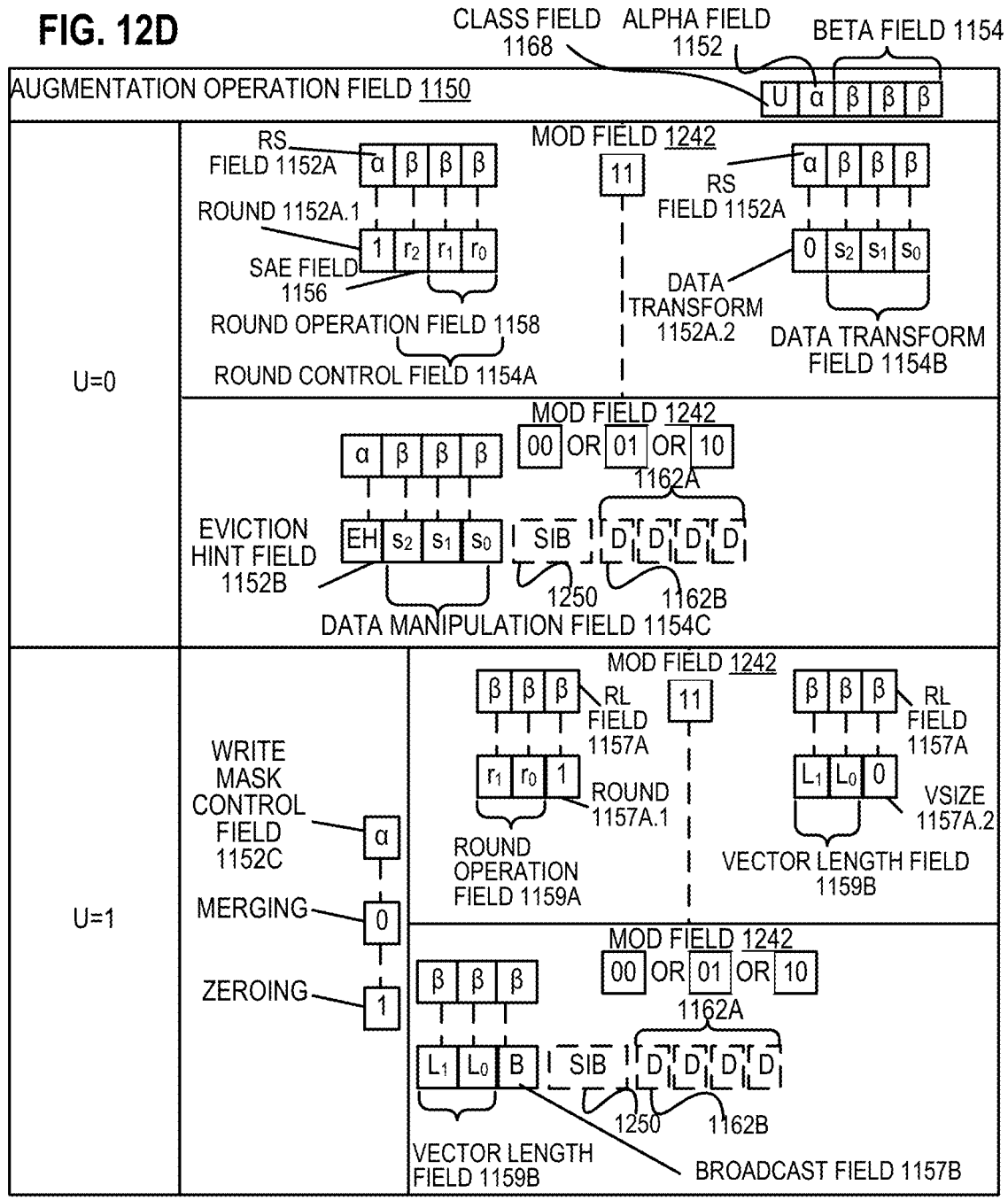
FIG. 12D is a block diagram illustrating the fields of the specific vector friendly instruction format in FIG. 12A that make up the augmentation operation field 1150 according to one embodiment of the disclosure.

FIG. 12D is a block diagram illustrating the fields of the specific vector friendly instruction format 1200 that make up the augmentation operation field 1150 according to one embodiment of the disclosure. When the class (U) field 1168 contains 0, it signifies EVEX.U0 (class A 1168A); when it contains 1, it signifies EVEX.U1 (class B 1168B). When U=0 and the MOD field 1242 contains 11 (signifying a no memory access operation), the alpha field 1152 (EVEX byte 3, bit [7]— EH) is interpreted as the rs field 1152A. When the rs field 1152A contains a 1 (round 1152A.1), the beta field 1154 (EVEX byte 3, bits [6:4]-SSS) is interpreted as the round control field 1154A. The round control field 1154A includes a one bit SAE field 1156 and a two bit round operation field 1158. When the rs field 1152A contains a 0 (data transform 1152A.2), the beta field 1154 (EVEX byte 3, bits [6:4]-SSS) is interpreted as a three bit data transform field 1154B. When U=0 and the MOD field 1242 contains 00, 01, or 10 (signifying a memory access operation), the alpha field 1152 (EVEX byte 3, bit [7]— EH) is interpreted as the eviction hint (EH) field 1152B and the beta field 1154 (EVEX byte 3, bits [6:4]-SSS) is interpreted as a three bit data manipulation field 1154C.

When U=1, the alpha field 1152 (EVEX byte 3, bit [7]— EH) is interpreted as the write mask control (Z) field 1152C. When U=1 and the MOD field 1242 contains 11 (signifying a no memory access operation), part of the beta field 1154 (EVEX byte 3, bit [4]-$S_0$) is interpreted as the RL field 1157A; when it contains a 1 (round 1157A.1) the rest of the beta field 1154 (EVEX byte 3, bit [6-5]-$S_{2-1}$) is interpreted as the round operation field 1159A, while when the RL field 1157A contains a 0 (VSIZE 1157.A2) the rest of the beta field 1154 (EVEX byte 3, bit [6-5]-$S_{2-1}$) is interpreted as the vector length field 1159B (EVEX byte 3, bit [6-5]-$L_{1-0}$). When U=1 and the MOD field 1242 contains 00, 01, or 10 (signifying a memory access operation), the beta field 1154 (EVEX byte 3, bits [6:4]-SSS) is interpreted as the vector length field 1159B (EVEX byte 3, bit [6-5]-$L_{1-0}$) and the broadcast field 1157B (EVEX byte 3, bit [4]-B).

Exemplary Register Architecture

Figure 13:
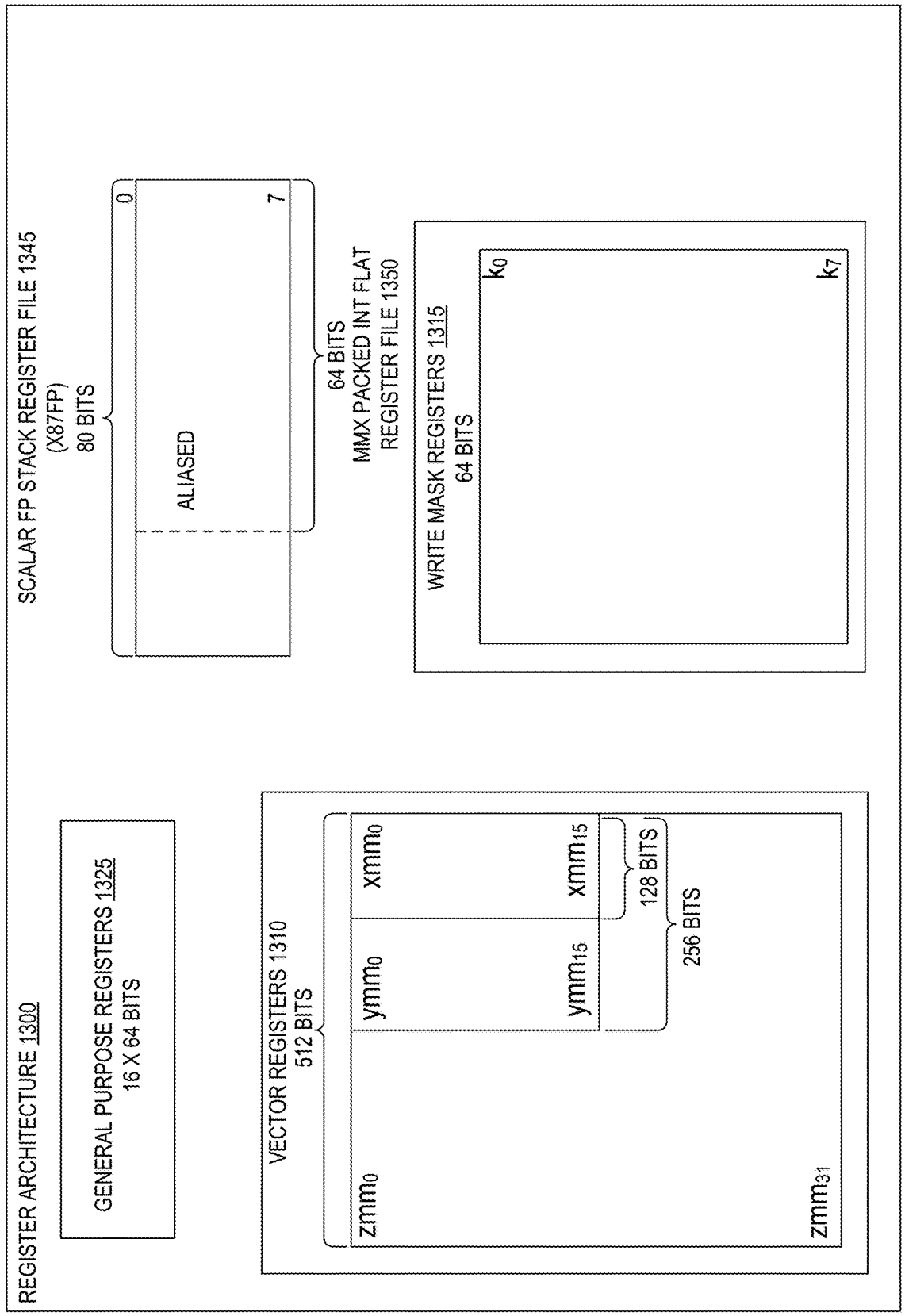
FIG. 13 is a block diagram of a register architecture according to one embodiment of the disclosure.

FIG. 13 is a block diagram of a register architecture 1300 according to one embodiment of the disclosure. In the embodiment illustrated, there are 32 vector registers 1310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1200 operates on these overlaid register file as illustrated in the below tables.

| Adjustable Vector Length | Class | Operations | Registers |
|---|---|---|---|
| Instruction Templates that do not include the vector length field 1159B | A (FIG. 11A; U = 0) | 1110, 1115, 1125, 1130 | zmm registers (the vector length is 64 byte) |
| | B (FIG. 11B; U = 1) | 1112 | zmm registers (the vector length is 64 byte) |
| Instruction templates that do include the vector length field 1159B | B (FIG. 11B; U = 1) | 1117, 1127 | zmm, ymm, or xmm registers (the vector length is 64 byte, 32 byte, or 16 byte) depending on the vector length field 1159B |

In other words, the vector length field 1159B selects between a maximum length and one or more other shorter lengths, where each such shorter length is half the length of the preceding length; and instructions templates without the vector length field 1159B operate on the maximum vector length. Further, in one embodiment, the class B instruction templates of the specific vector friendly instruction format 1200 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the embodiment.

Write mask registers 1315—in the embodiment illustrated, there are 8 write mask registers (k0 through k7), each 64 bits in size. In an alternate embodiment, the write mask registers 1315 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1345, on which is aliased the MMX packed integer flat register file 1350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figures 14A, 14B:
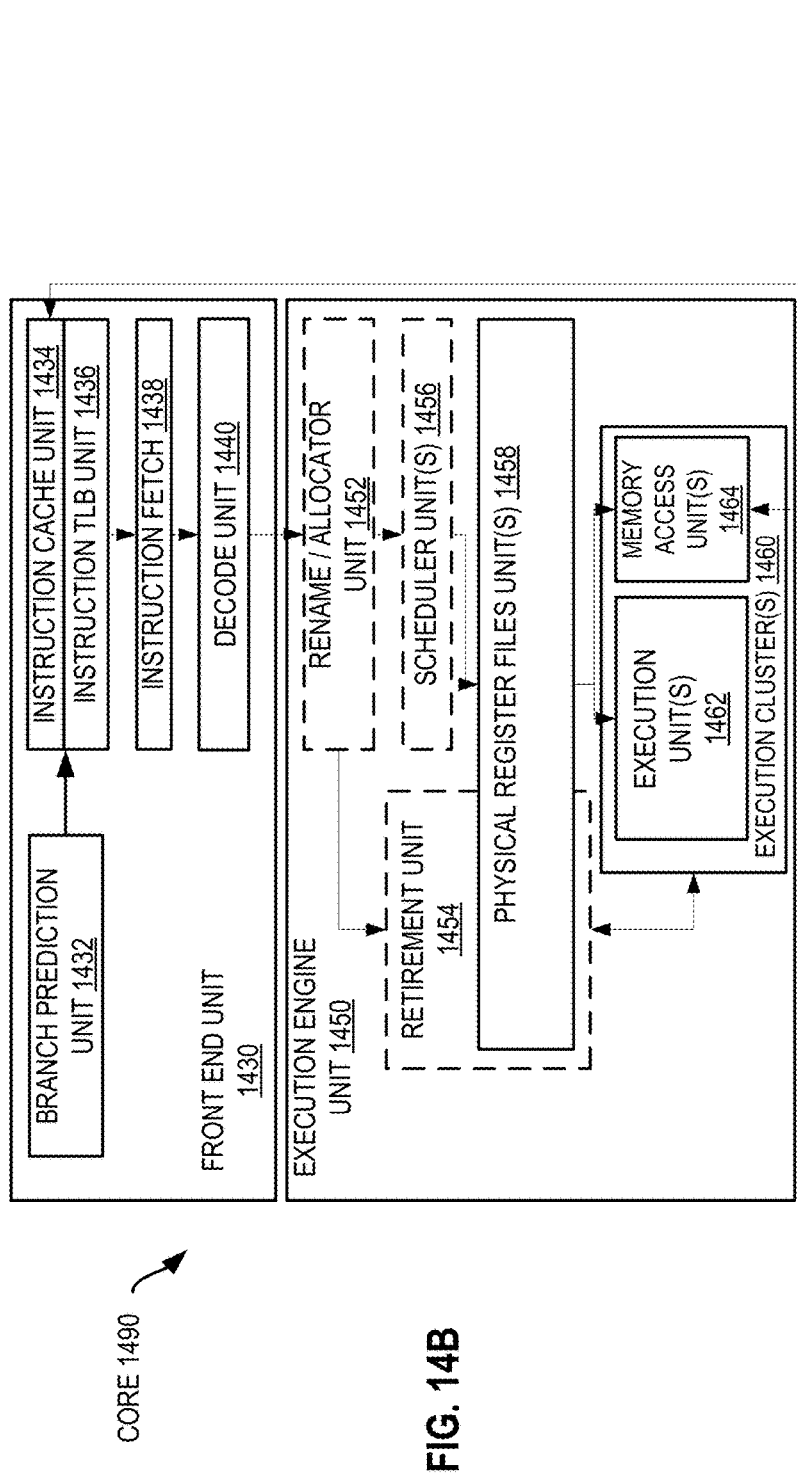
FIG. 14A is a block diagram illustrating both an exemplary in-order pipeline and an exemplary register renaming, out-of-order issue/execution pipeline according to embodiments of the disclosure.
FIG. 14B is a block diagram illustrating both an exemplary embodiment of an in-order architecture core and an exemplary register renaming, out-of-order issue/execution architecture core to be included in a processor according to embodiments of the disclosure.

FIG. 14A is a block diagram illustrating both an exemplary in-order pipeline and an exemplary register renaming, out-of-order issue/execution pipeline according to embodiments of the disclosure. FIG. 14B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 14A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 14A, a processor pipeline 1400 includes a fetch stage 1402, a length decode stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

FIG. 14B shows processor core 1490 including a front end unit 1430 coupled to an execution engine unit 1450, and both are coupled to a memory unit 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front end unit 1430 includes a branch prediction unit 1432 coupled to an instruction cache unit 1434, which is coupled to an instruction translation lookaside buffer (TLB) 1436, which is coupled to an instruction fetch unit 1438, which is coupled to a decode unit 1440. The decode unit 1440 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1490 includes a microcode ROM or other medium that stores microcode for certain macro-instructions (e.g., in decode unit 1440 or otherwise within the front end unit 1430). The decode unit 1440 is coupled to a rename/allocator unit 1452 in the execution engine unit 1450.

The execution engine unit 1450 includes the rename/allocator unit 1452 coupled to a retirement unit 1454 and a set of one or more scheduler unit(s) 1456. The scheduler unit(s) 1456 represents any number of different schedulers, including reservations stations, central instruction window, etc. The scheduler unit(s) 1456 is coupled to the physical register file(s) unit(s) 1458. Each of the physical register file(s) units 1458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1458 comprises a vector registers unit, a write mask registers unit, and a scalar registers unit. These register units may provide architectural vector registers, vector mask registers, and general-purpose registers. The physical register file(s) unit(s) 1458 is overlapped by the retirement unit 1454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1454 and the physical register file(s) unit(s) 1458 are coupled to the execution cluster(s) 1460. The execution cluster(s) 1460 includes a set of one or more execution units 1462 and a set of one or more memory access units 1464. The execution units 1462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1456, physical register file(s) unit(s) 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1464). It should also be understood that where separate pipelines are used, one or more of these pipelines may be out-of-order issue/execution and the rest in-order.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

In certain embodiments, a prefetch circuit 1478 is included to prefetch data, for example, to predict access addresses and bring the data for those addresses into a cache or caches (e.g., from memory 1480).

By way of example, the exemplary register renaming, out-of-order issue/execution core architecture may implement the pipeline 1400 as follows: 1) the instruction fetch 1438 performs the fetch and length decoding stages 1402 and 1404; 2) the decode unit 1440 performs the decode stage 1406; 3) the rename/allocator unit 1452 performs the allocation stage 1408 and renaming stage 1410; 4) the scheduler unit(s) 1456 performs the schedule stage 1412; 5) the physical register file(s) unit(s) 1458 and the memory unit 1470 perform the register read/memory read stage 1414; the execution cluster 1460 perform the execute stage 1416; 6) the memory unit 1470 and the physical register file(s) unit(s) 1458 perform the write back/memory write stage 1418; 7) various units may be involved in the exception handling stage 1422; and 8) the retirement unit 1454 and the physical register file(s) unit(s) 1458 perform the commit stage 1424.

The core 1490 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 1434/1474 and a shared L2 cache unit 1476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 15B:
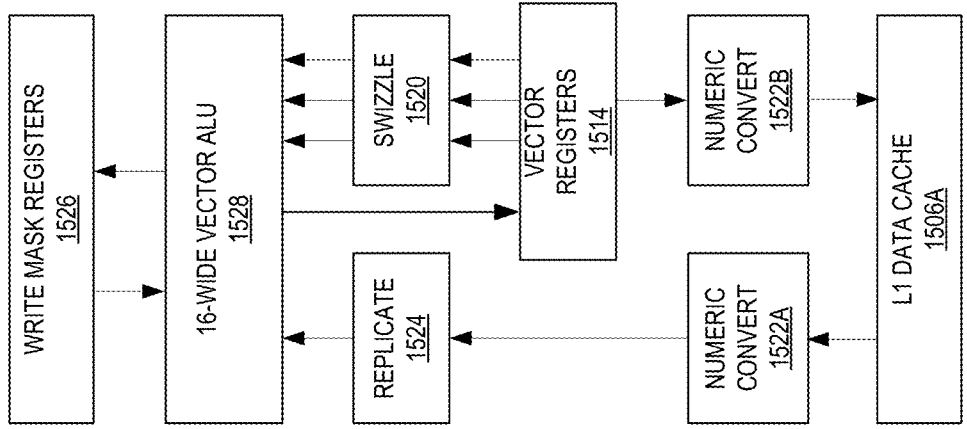
FIG. 15B is an expanded view of part of the processor core in FIG. 15A according to embodiments of the disclosure.
Figure 15A:
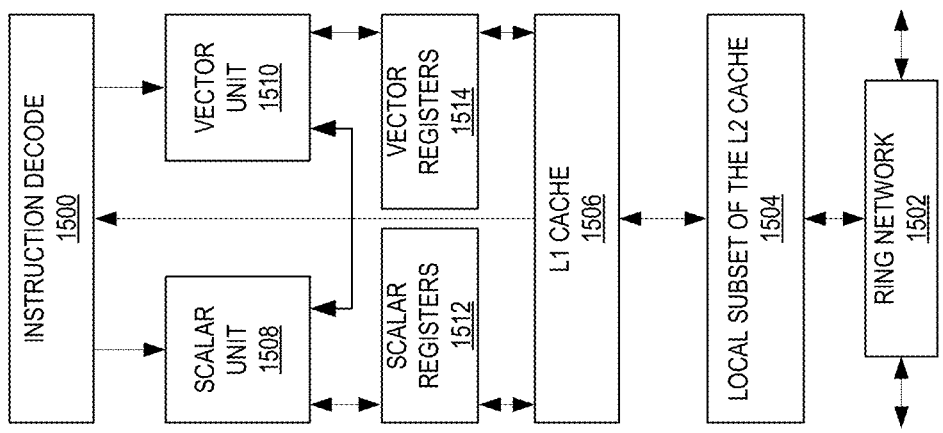
FIG. 15A is a block diagram of a single processor core, along with its connection to the on-die interconnect network and with its local subset of the Level 2 (L2) cache, according to embodiments of the disclosure.

FIGS. 15A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 15A is a block diagram of a single processor core, along with its connection to the on-die interconnect network 1502 and with its local subset of the Level 2 (L2) cache

1504, according to embodiments of the disclosure. In one embodiment, an instruction decode unit 1500 supports the x86 instruction set with a packed data instruction set extension. An L1 cache 1506 allows low-latency accesses to cache memory into the scalar and vector units. While in one embodiment (to simplify the design), a scalar unit 1508 and a vector unit 1510 use separate register sets (respectively, scalar registers 1512 and vector registers 1514) and data transferred between them is written to memory and then read back in from a level 1 (L1) cache 1506, alternative embodiments of the disclosure may use a different approach (e.g., use a single register set or include a communication path that allow data to be transferred between the two register files without being written and read back).

The local subset of the L2 cache 1504 is part of a global L2 cache that is divided into separate local subsets, one per processor core. Each processor core has a direct access path to its own local subset of the L2 cache 1504. Data read by a processor core is stored in its L2 cache subset 1504 and can be accessed quickly, in parallel with other processor cores accessing their own local L2 cache subsets. Data written by a processor core is stored in its own L2 cache subset 1504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 15B is an expanded view of part of the processor core in FIG. 15A according to embodiments of the disclosure. FIG. 15B includes an L1 data cache 1506A part of the L1 cache 1504, as well as more detail regarding the vector unit 1510 and the vector registers 1514. Specifically, the vector unit 1510 is a 16-wide vector processing unit (VPU) (see the 16-wide ALU 1528), which executes one or more of integer, single-precision float, and double-precision float instructions. The VPU supports swizzling the register inputs with swizzle unit 1520, numeric conversion with numeric convert units 1522A-B, and replication with replication unit 1524 on the memory input. Write mask registers 1526 allow predicating resulting vector writes.

Figure 16:
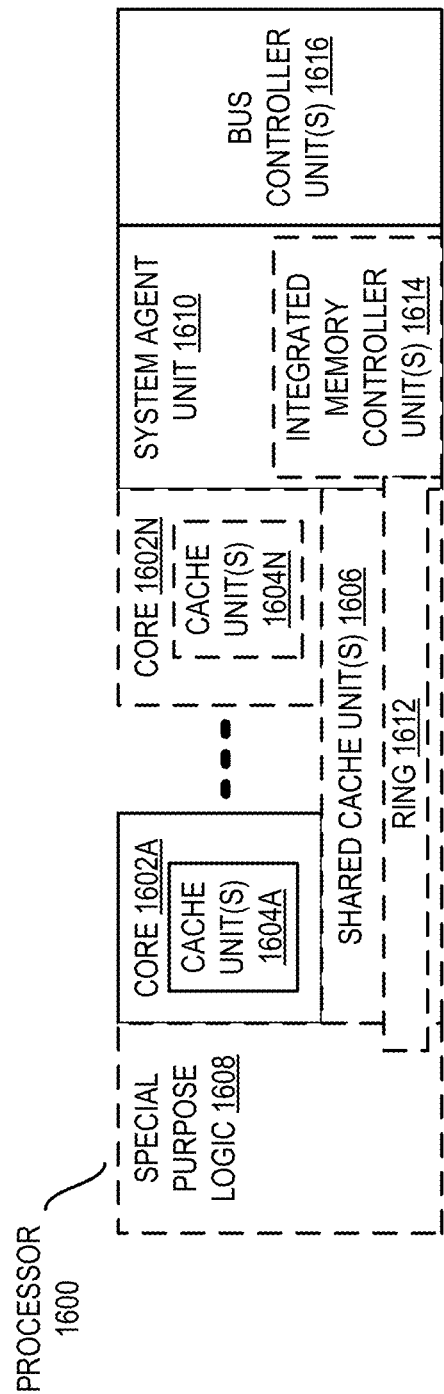
FIG. 16 is a block diagram of a processor that may have more than one core, may have an integrated memory controller, and may have integrated graphics according to embodiments of the disclosure.

FIG. 16 is a block diagram of a processor 1600 that may have more than one core, may have an integrated memory controller, and may have integrated graphics according to embodiments of the disclosure. The solid lined boxes in FIG. 16 illustrate a processor 1600 with a single core 1602A, a system agent 1610, a set of one or more bus controller units 1616, while the optional addition of the dashed lined boxes illustrates an alternative processor 1600 with multiple cores 1602A-N, a set of one or more integrated memory controller unit(s) 1614 in the system agent unit 1610, and special purpose logic 1608.

Thus, different implementations of the processor 1600 may include: 1) a CPU with the special purpose logic 1608 being integrated graphics and/or scientific (throughput) logic (which may include one or more cores), and the cores 1602A-N being one or more general purpose cores (e.g., general purpose in-order cores, general purpose out-of-order cores, a combination of the two); 2) a coprocessor with the cores 1602A-N being a large number of special purpose cores intended primarily for graphics and/or scientific (throughput); and 3) a coprocessor with the cores 1602A-N being a large number of general purpose in-order cores. Thus, the processor 1600 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1606, and external memory (not shown) coupled to the set of integrated memory controller units 1614. The set of shared cache units 1606 may include one or more mid-level caches, such as level 2 (L2), level 3 (L3), level 4 (L4), or other levels of cache, a last level cache (LLC), and/or combinations thereof. While in one embodiment a ring-based interconnect unit 1612 interconnects the integrated graphics logic 1608, the set of shared cache units 1606, and the system agent unit 1610/integrated memory controller unit(s) 1614, alternative embodiments may use any number of well-known techniques for interconnecting such units. In one embodiment, coherency is maintained between one or more cache units 1606 and cores 1602-A-N.

In some embodiments, one or more of the cores 1602A-N are capable of multi-threading. The system agent 1610 includes those components coordinating and operating cores 1602A-N. The system agent unit 1610 may include for example a power control unit (PCU) and a display unit. The PCU may be or include logic and components needed for regulating the power state of the cores 1602A-N and the integrated graphics logic 1608. The display unit is for driving one or more externally connected displays.

The cores 1602A-N may be homogenous or heterogeneous in terms of architecture instruction set; that is, two or more of the cores 1602A-N may be capable of execution the same instruction set, while others may be capable of executing only a subset of that instruction set or a different instruction set.

Exemplary Computer Architectures

FIGS. 17-20 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 17:
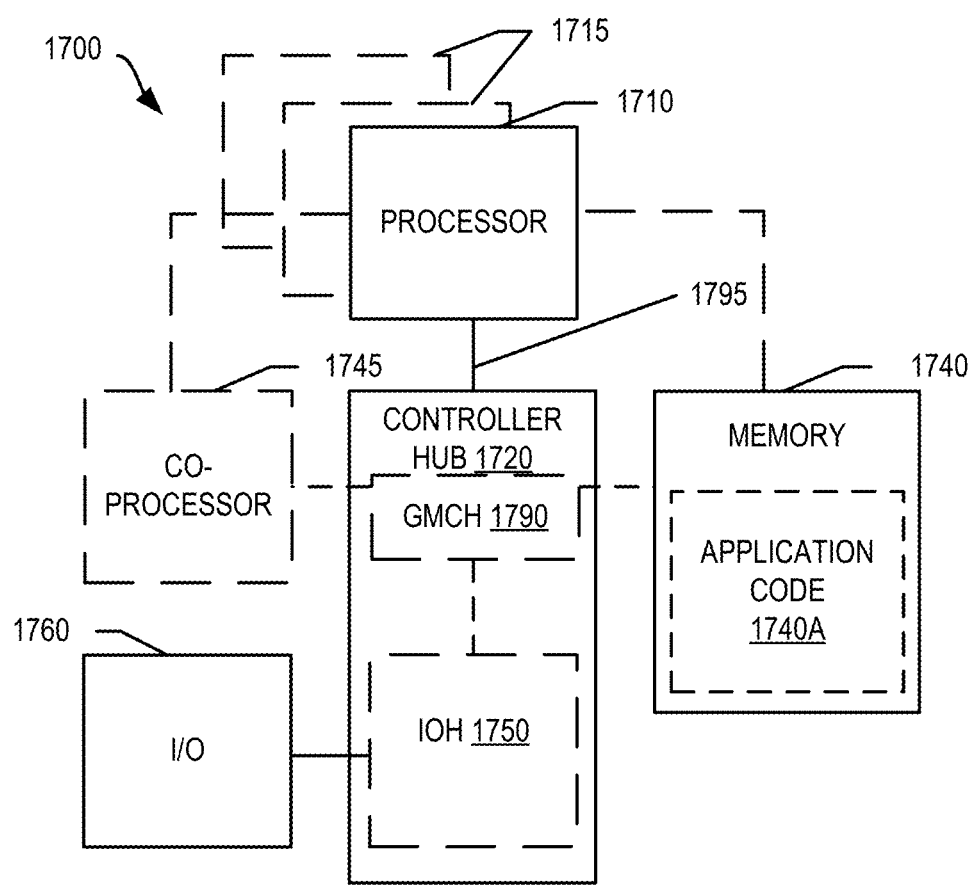
FIG. 17 is a block diagram of a system in accordance with one embodiment of the present disclosure.

Referring now to FIG. 17, shown is a block diagram of a system 1700 in accordance with one embodiment of the present disclosure. The system 1700 may include one or more processors 1710, 1715, which are coupled to a controller hub 1720. In one embodiment the controller hub 1720 includes a graphics memory controller hub (GMCH) 1790 and an Input/Output Hub (IOH) 1750 (which may be on separate chips); the GMCH 1790 includes memory and graphics controllers to which are coupled memory 1740 and a coprocessor 1745; the IOH 1750 is couples input/output (I/O) devices 1760 to the GMCH 1790. Alternatively, one or both of the memory and graphics controllers are integrated within the processor (as described herein), the memory 1740 and the coprocessor 1745 are coupled directly to the processor 1710, and the controller hub 1720 in a single chip with the IOH 1750. Memory 1740 may include application code 1740A, for example, to store code that when executed causes a processor to perform any method of this disclosure.

The optional nature of additional processors 1715 is denoted in FIG. 17 with broken lines. Each processor 1710, 1715 may include one or more of the processing cores described herein and may be some version of the processor 1600.

The memory 1740 may be, for example, dynamic random-access memory (DRAM), phase change memory (PCM), or a combination of the two. For at least one embodiment, the controller hub 1720 communicates with the processor(s) 1710, 1715 via a multi-drop bus, such as a frontside bus (FSB), point-to-point interface such as Quickpath Interconnect (QPI), or similar connection 1795.

In one embodiment, the coprocessor 1745 is a special-purpose processor, such as, for example, a high-throughput MIC processor, a network or communication processor, compression engine, graphics processor, GPGPU, embedded processor, or the like. In one embodiment, controller hub 1720 may include an integrated graphics accelerator.

There can be a variety of differences between the physical resources 1710, 1715 in terms of a spectrum of metrics of merit including architectural, microarchitectural, thermal, power consumption characteristics, and the like.

In one embodiment, the processor 1710 executes instructions that control data processing operations of a general type. Embedded within the instructions may be coprocessor instructions. The processor 1710 recognizes these coprocessor instructions as being of a type that should be executed by the attached coprocessor 1745. Accordingly, the processor 1710 issues these coprocessor instructions (or control signals representing coprocessor instructions) on a coprocessor bus or other interconnect, to coprocessor 1745. Coprocessor(s) 1745 accept and execute the received coprocessor instructions.

Figure 18:
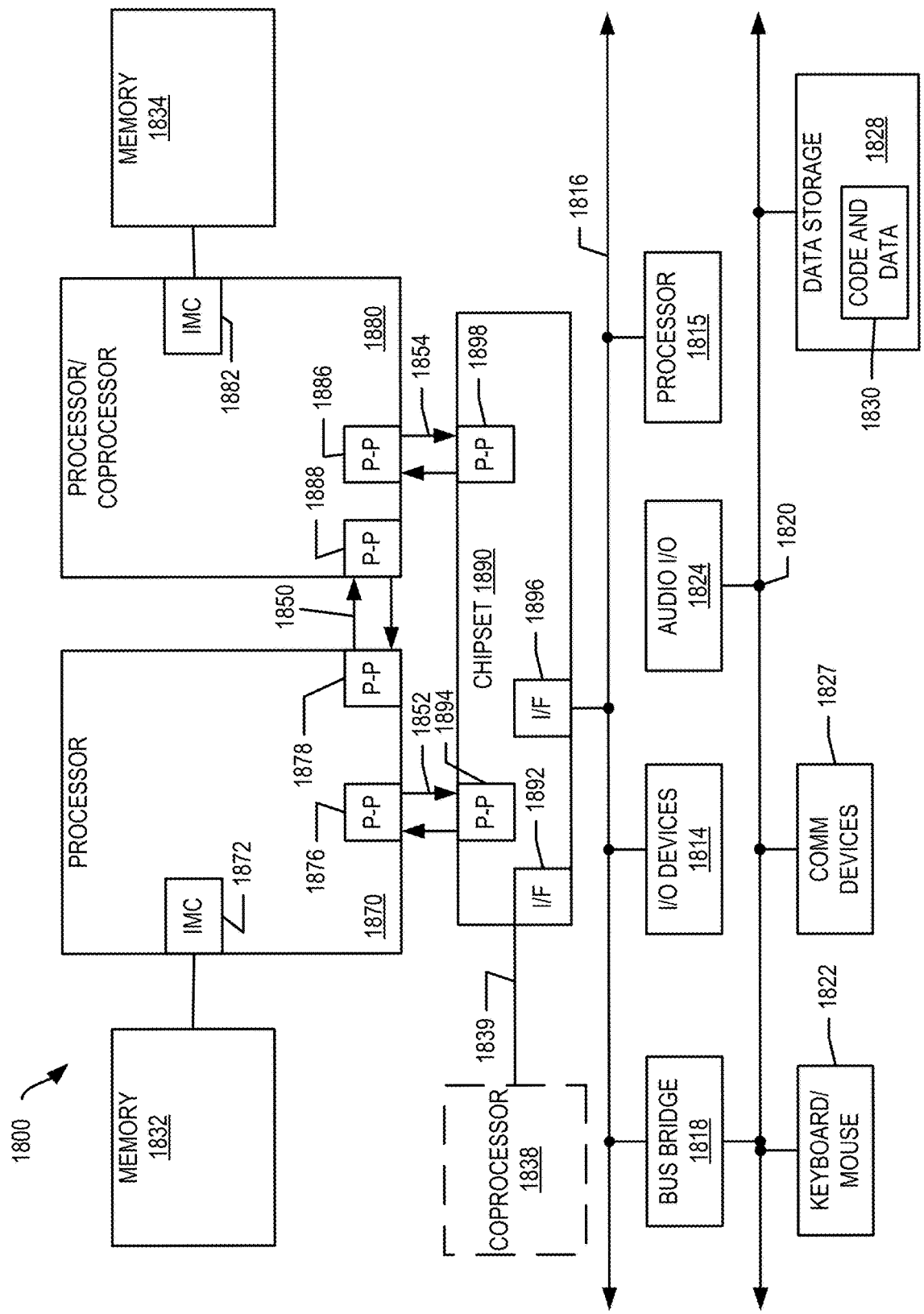
FIG. 18 is a block diagram of a more specific exemplary system in accordance with an embodiment of the present disclosure.

Referring now to FIG. 18, shown is a block diagram of a first more specific exemplary system 1800 in accordance with an embodiment of the present disclosure. As shown in FIG. 18, multiprocessor system 1800 is a point-to-point interconnect system, and includes a first processor 1870 and a second processor 1880 coupled via a point-to-point interconnect 1850. Each of processors 1870 and 1880 may be some version of the processor 1600. In one embodiment of the disclosure, processors 1870 and 1880 are respectively processors 1710 and 1715, while coprocessor 1838 is coprocessor 1745. In another embodiment, processors 1870 and 1880 are respectively processor 1710 coprocessor 1745.

Processors 1870 and 1880 are shown including integrated memory controller (IMC) units 1872 and 1882, respectively. Processor 1870 also includes as part of its bus controller units point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 may each exchange information with a chipset 1890 via individual P-P interfaces 1852, 1854 using point to point interface circuits 1876, 1894, 1886, 1898. Chipset 1890 may optionally exchange information with the coprocessor 1838 via a high-performance interface 1839. In one embodiment, the coprocessor 1838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1890 may be coupled to a first bus 1816 via an interface 1896. In one embodiment, first bus 1816 may be a Peripheral Component Interconnect (PCI) bus, or a bus such as a PCI Express bus or another third generation I/O interconnect bus, although the scope of the present disclosure is not so limited.

As shown in FIG. 18, various I/O devices 1814 may be coupled to first bus 1816, along with a bus bridge 1818 which couples first bus 1816 to a second bus 1820. In one embodiment, one or more additional processor(s) 1815, such as coprocessors, high-throughput MIC processors, GPGPU's, accelerators (such as, e.g., graphics accelerators or digital signal processing (DSP) units), field programmable gate arrays, or any other processor, are coupled to first bus 1816. In one embodiment, second bus 1820 may be a low pin count (LPC) bus. Various devices may be coupled to a second bus 1820 including, for example, a keyboard and/or mouse 1822, communication devices 1827 and a storage unit 1828 such as a disk drive or other mass storage device which may include instructions/code and data 1830, in one embodiment. Further, an audio I/O 1824 may be coupled to the second bus 1820. Note that other architectures are possible. For example, instead of the point-to-point architecture of FIG. 18, a system may implement a multi-drop bus or other such architecture.

Figure 19:
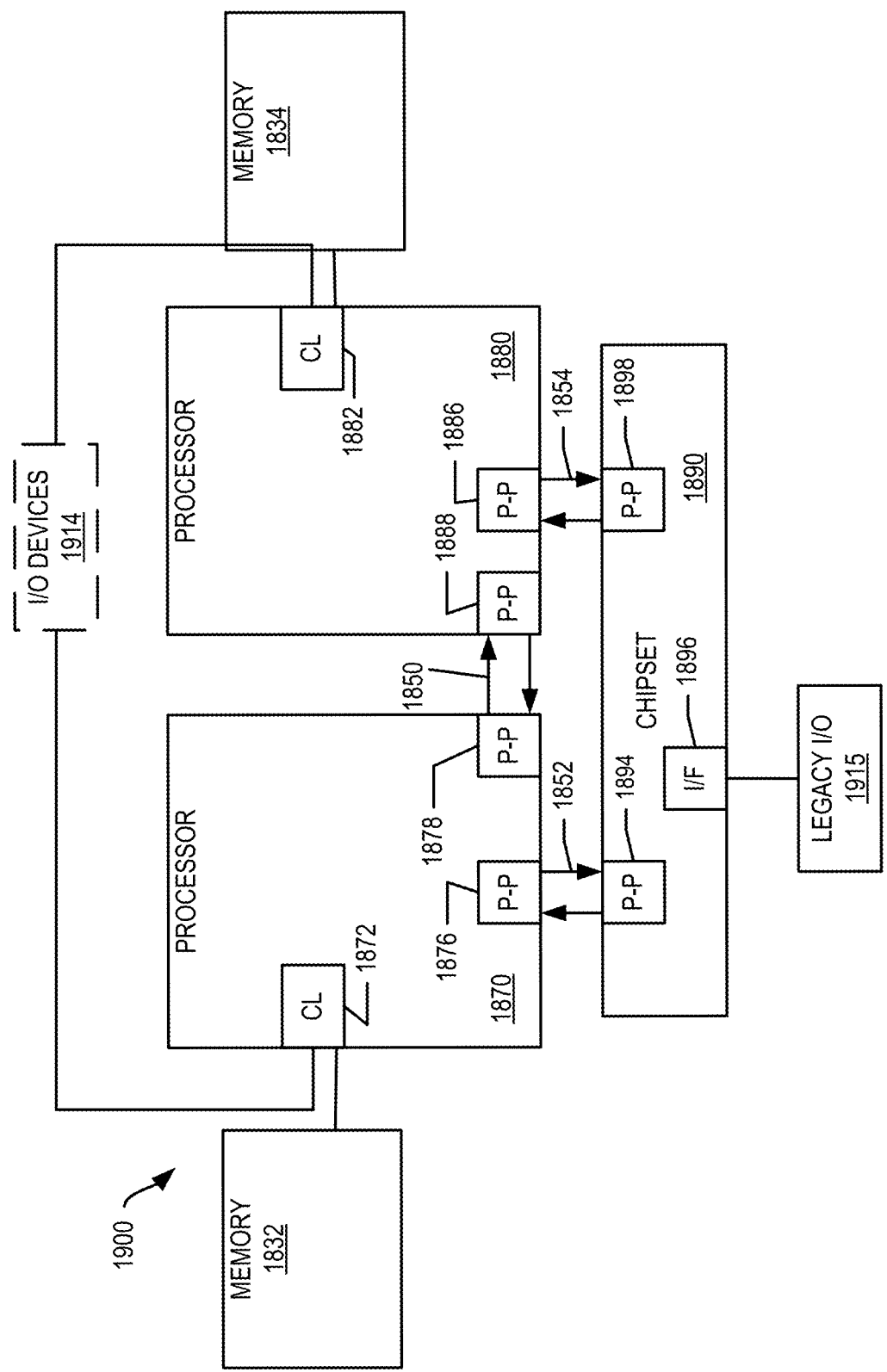
FIG. 19, shown is a block diagram of a second more specific exemplary system in accordance with an embodiment of the present disclosure.

Referring now to FIG. 19, shown is a block diagram of a second more specific exemplary system 1900 in accordance with an embodiment of the present disclosure. Like elements in FIGS. 18 and 19 bear like reference numerals, and certain aspects of FIG. 18 have been omitted from FIG. 19 in order to avoid obscuring other aspects of FIG. 19.

FIG. 19 illustrates that the processors 1870, 1880 may include integrated memory and I/O control logic ("CL") 1872 and 1882, respectively. Thus, the CL 1872, 1882 include integrated memory controller units and include I/O control logic. FIG. 19 illustrates that not only are the memories 1832, 1834 coupled to the CL 1872, 1882, but also that I/O devices 1914 are also coupled to the control logic 1872, 1882. Legacy I/O devices 1915 are coupled to the chipset 1890.

Figure 20:
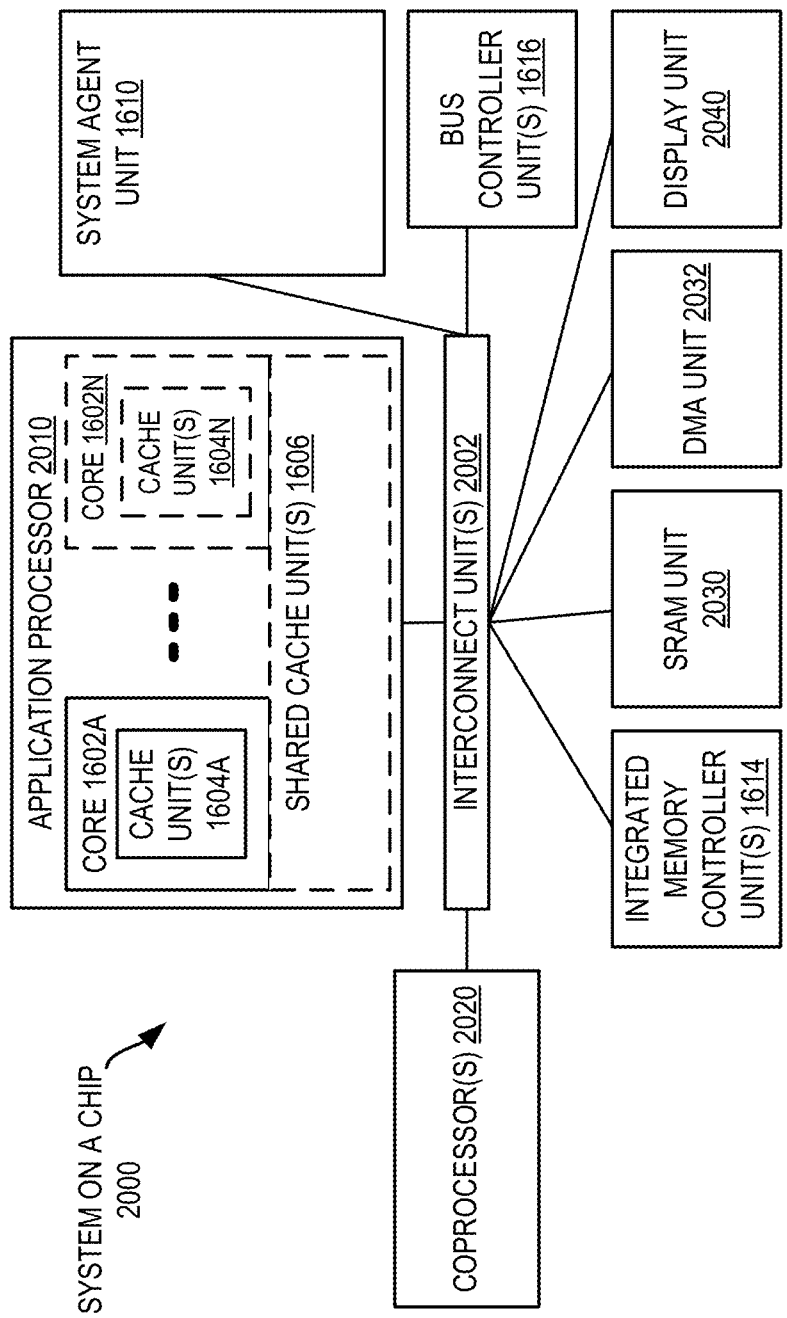
FIG. 20, shown is a block diagram of a system on a chip (SoC) in accordance with an embodiment of the present disclosure.

Referring now to FIG. 20, shown is a block diagram of a SoC 2000 in accordance with an embodiment of the present disclosure. Similar elements in FIG. 16 bear like reference numerals. Also, dashed lined boxes are optional features on more advanced SoCs. In FIG. 20, an interconnect unit(s) 2002 is coupled to: an application processor 2010 which includes a set of one or more cores 1602A-N and shared cache unit(s) 1606; a system agent unit 1610; a bus controller unit(s) 1616; an integrated memory controller unit(s) 1614; a set or one or more coprocessors 2020 which may include integrated graphics logic, an image processor, an audio processor, and a video processor; an static random access memory (SRAM) unit 2030; a direct memory access (DMA) unit 2032; and a display unit 2040 for coupling to one or more external displays. In one embodiment, the coprocessor(s) 2020 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1830 illustrated in FIG. 18, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 21:
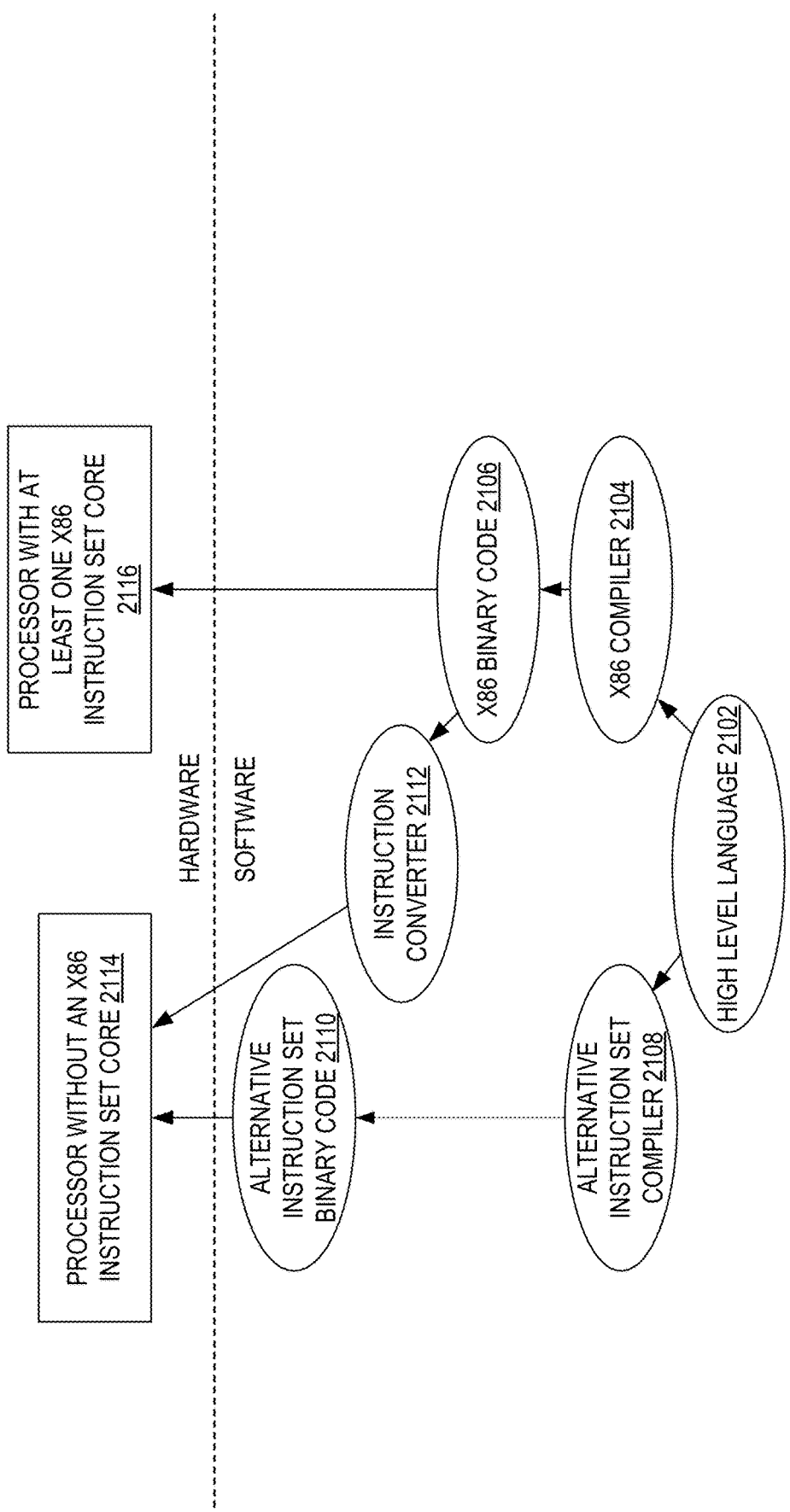
FIG. 21 is a block diagram contrasting the use of a software instruction converter to convert binary instructions in a source instruction set to binary instructions in a target instruction set according to embodiments of the disclosure.

FIG. 21 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 21 shows a program in a high-level language 2102 may be compiled using an x86 compiler 2104 to generate x86 binary code 2106 that may be natively executed by a processor with at least one x86 instruction set core 2116. The processor with at least one x86 instruction set core 2116 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 2104 represents a compiler that is operable to generate x86 binary code 2106 (e.g., object code) that can, with or without additional linkage processing, be executed on the processor with at least one x86 instruction set core 2116. Similarly, FIG. 21 shows the program in the high level language 2102 may be compiled using an alternative instruction set compiler 2108 to generate alternative instruction set binary code 2110 that may be natively executed by a processor without at least one x86 instruction set core 2114 (e.g., a processor with cores that execute the MIPS instruction set of MIPS Technologies of Sunnyvale, CA and/or that execute the ARM instruction set of ARM Holdings of Sunnyvale, CA). The instruction converter 2112 is used to convert the x86 binary code 2106 into code that may be natively executed by the processor without an x86 instruction set core 2114. This converted code is not likely to be the same as the alternative instruction set binary code 2110 because an instruction converter capable of this is difficult to make; however, the converted code will accomplish the general operation and be made up of instructions from the alternative instruction set. Thus, the instruction converter 2112 represents software, firmware, hardware, or a combination thereof that, through emulation, simulation, or any other process, allows a processor or other electronic device that does not have an x86 instruction set processor or core to execute the x86 binary code 2106.

What is claimed is:

1. An apparatus comprising:
    a two-dimensional grid of compute circuits;
    a memory;
    a direct memory access circuit coupled to the memory and the two-dimensional grid of compute circuits;
    a decoder circuit to decode a single instruction into a decoded single instruction, the single instruction including a first field to identify a base address of two-dimensional data in the memory, a second field to identify a number of elements in each one-dimensional array of the two-dimensional data, a third field to identify a number of one-dimensional arrays of the two-dimensional data, a fourth field to identify an operation to be performed by the two-dimensional grid of compute circuits, and a fifth field to indicate the direct memory access circuit is to move the two-dimensional data indicated by the first field, the second field, and the third field into the two-dimensional grid of compute circuits and the two-dimensional grid of compute circuits is to perform the operation on the two-dimensional data according to the fourth field; and an execution circuit to execute the decoded single instruction according to the fields.

2. The apparatus of claim 1, wherein the single instruction further comprises a field to indicate a delay time to wait before pushing first values of the two-dimensional data to each corresponding input port of the two-dimensional grid of compute circuits.

3. The apparatus of claim 2, wherein the single instruction further comprises a field to indicate a data value that is to be pushed into each corresponding input port of the two-dimensional grid of compute circuits during the delay time.

4. The apparatus of claim 1, wherein the single instruction further comprises a field that when set to a first value causes the two-dimensional data to be sent to a first proper subset of input ports of the two-dimensional grid of compute circuits, and when set to a second different value causes the two-dimensional data to be sent to a second different proper subset of input ports of the two-dimensional grid of compute circuits.

5. The apparatus of claim 1, wherein the single instruction further comprises a field that when set to a multicast value causes a single element of the two-dimensional data to be sent to a plurality of compute circuits of the two-dimensional grid of compute circuits.

6. The apparatus of claim 1, wherein a value from the fourth field that identifies the operation is passed from a first compute circuit to a second compute circuit of the two-dimensional grid of compute circuits.

7. The apparatus of claim 1, wherein the single instruction further comprises a field that when set to a first value indicates the direct memory access circuit is to perform address generation for each element of the two-dimensional data as row major, and when set to a second different value indicates the direct memory access circuit is to perform the address generation for each element of the two-dimensional data as column major.

8. The apparatus of claim 1, wherein:

the decoder circuit is to decode a second single instruction into a decoded second single instruction, the second single instruction including a first field to identify a base address for two-dimensional data to be stored in the memory, a second field to identify a number of elements in each one-dimensional array of the two-dimensional data to be stored in the memory, a third field to identify a number of one-dimensional arrays of the two-dimensional data to be stored in the memory, a fourth field to indicate the direct memory access circuit is to move the two-dimensional data indicated by the first field, the second field, and the third field from the two-dimensional grid of compute circuits into the memory; and the execution circuit to execute the decoded second single instruction according to the fields.

9. A method comprising:

decoding a single instruction with a decoder circuit, of a processor comprising a two-dimensional grid of compute circuits, a memory, and a direct memory access circuit coupled to the memory and the two-dimensional grid of compute circuits, into a decoded single instruction, the single instruction including a first field to identify a base address of two-dimensional data in the memory, a second field to identify a number of elements in each one-dimensional array of the two-dimensional data, a third field to identify a number of one-dimensional arrays of the two-dimensional data, a fourth field to identify an operation to be performed by the two-dimensional grid of compute circuits, and a fifth field to indicate the direct memory access circuit is to move the two-dimensional data indicated by the first field, the second field, and the third field into the two-dimensional grid of compute circuits and the two-dimensional grid of compute circuits is to perform the operation on the two-dimensional data according to the fourth field; and executing the decoded single instruction with an execution circuit of the processor according to the fields.

10. The method of claim 9, wherein the single instruction further comprises a field to indicate a delay time to wait before pushing first values of the two-dimensional data to each corresponding input port of the two-dimensional grid of compute circuits.

11. The method of claim 10, wherein the single instruction further comprises a field to indicate a data value that is to be pushed into each corresponding input port of the two-dimensional grid of compute circuits during the delay time.

12. The method of claim 9, wherein the single instruction further comprises a field that when set to a first value causes the two-dimensional data to be sent to a first proper subset of input ports of the two-dimensional grid of compute circuits, and when set to a second different value causes the two-dimensional data to be sent to a second different proper subset of input ports of the two-dimensional grid of compute circuits.

13. The method of claim 9, wherein the single instruction further comprises a field that when set to a multicast value causes a single element of the two-dimensional data to be sent to a plurality of compute circuits of the two-dimensional grid of compute circuits.

14. The method of claim 9, wherein a value from the fourth field that identifies the operation is passed from a first compute circuit to a second compute circuit of the two-dimensional grid of compute circuits.

15. The method of claim 9, wherein the single instruction further comprises a field that when set to a first value indicates the direct memory access circuit is to perform address generation for each element of the two-dimensional data as row major, and when set to a second different value indicates the direct memory access circuit is to perform the address generation for each element of the two-dimensional data as column major.

16. The method of claim 9, further comprising:

decoding a second single instruction with the decoder circuit into a decoded second single instruction, the second single instruction including a first field to identify a base address for two-dimensional data to be stored in the memory, a second field to identify a number of elements in each one-dimensional array of the two-dimensional data to be stored in the memory, a third field to identify a number of one-dimensional arrays of the two-dimensional data to be stored in the memory, a fourth field to indicate the direct memory access circuit is to move the two-dimensional data indicated by the first field, the second field, and the third field from the two-dimensional grid of compute circuits into the memory; and executing the decoded second single instruction with the execution circuit according to the fields.

17. An apparatus comprising:
a first type of hardware processor core comprising:
   a two-dimensional grid of compute circuits,
   a memory, and
   a direct memory access circuit coupled to the memory and the two-dimensional grid of compute circuits; and
a second different type of hardware processor core coupled to the first type of hardware processor core and comprising:
   a decoder circuit to decode a single instruction into a decoded single instruction, the single instruction including a first field to identify a base address of two-dimensional data in the memory, a second field to identify a number of elements in each one-dimensional array of the two-dimensional data, a third field to identify a number of one-dimensional arrays of the two-dimensional data, a fourth field to identify an operation to be performed by the two-dimensional grid of compute circuits, and a fifth field to indicate the direct memory access circuit is to move the two-dimensional data indicated by the first field, the second field, and the third field into the two-dimensional grid of compute circuits and the two-dimensional grid of compute circuits is to perform the operation on the two-dimensional data according to the fourth field, and
   an execution circuit to execute the decoded single instruction according to the fields.

18. The apparatus of claim 17, wherein the single instruction further comprises a field to indicate a delay time to wait before pushing first values of the two-dimensional data to each corresponding input port of the two-dimensional grid of compute circuits.

19. The apparatus of claim 18, wherein the single instruction further comprises a field to indicate a data value that is to be pushed into each corresponding input port of the two-dimensional grid of compute circuits during the delay time.

20. The apparatus of claim 17, wherein the single instruction further comprises a field that when set to a first value causes the two-dimensional data to be sent to a first proper subset of input ports of the two-dimensional grid of compute circuits, and when set to a second different value causes the two-dimensional data to be sent to a second different proper subset of input ports of the two-dimensional grid of compute circuits.

21. The apparatus of claim 17, wherein the single instruction further comprises a field that when set to a multicast value causes a single element of the two-dimensional data to be sent to a plurality of compute circuits of the two-dimensional grid of compute circuits.

22. The apparatus of claim 17, wherein a value from the fourth field that identifies the operation is passed from a first compute circuit to a second compute circuit of the two-dimensional grid of compute circuits.

23. The apparatus of claim 17, wherein the single instruction further comprises a field that when set to a first value indicates the direct memory access circuit is to perform address generation for each element of the two-dimensional data as row major, and when set to a second different value indicates the direct memory access circuit is to perform the address generation for each element of the two-dimensional data as column major.

24. The apparatus of claim 17, wherein:
the decoder circuit is to decode a second single instruction into a decoded second single instruction, the second single instruction including a first field to identify a base address for two-dimensional data to be stored in the memory, a second field to identify a number of elements in each one-dimensional array of the two-dimensional data to be stored in the memory, a third field to identify a number of one-dimensional arrays of the two-dimensional data to be stored in the memory, a fourth field to indicate the direct memory access circuit is to move the two-dimensional data indicated by the first field, the second field, and the third field from the two-dimensional grid of compute circuits into the memory; and
the execution circuit to execute the decoded second single instruction according to the fields.

* * * * *